(12) United States Patent
Lemelson et al.

(10) Patent No.: US 6,351,273 B1
(45) Date of Patent: Feb. 26, 2002

(54) SYSTEM AND METHODS FOR CONTROLLING AUTOMATIC SCROLLING OF INFORMATION ON A DISPLAY OR SCREEN

(76) Inventors: Jerome H. Lemelson, Suite 286, Unit 802, 930 Tahoe Blvd., Incline Village, NV (US) 89451; John H. Hiett, 1060 W. Boulder La., Flagstaff, AZ (US) 86001

( * ) Notice: Subject to any disclaimer, the term of this patent is extended or adjusted under 35 U.S.C. 154(b) by 0 days.

(21) Appl. No.: 08/845,958

(22) Filed: Apr. 30, 1997

(51) Int. Cl.[7] ............................. G09G 5/34; G10L 11/00

(52) U.S. Cl. ...................................... 345/786; 704/271

(58) Field of Search .................................. 345/156, 157, 345/158, 159, 973, 978, 784–787; 351/208, 210; 704/271, 275

(56) References Cited

U.S. PATENT DOCUMENTS

| | | | |
|---|---|---|---|
| 4,059,348 A | 11/1977 | Jernigan | 351/30 |
| 4,075,657 A | 2/1978 | Weinblatt | 358/93 |
| 4,102,564 A | 7/1978 | Michael | 351/7 |
| 4,145,122 A | 3/1979 | Rinard et al. | 351/7 |

(List continued on next page.)

FOREIGN PATENT DOCUMENTS

| | | | | |
|---|---|---|---|---|
| GB | 2 173 079 A | * | 3/1985 | 134/158 |
| JP | 59139433 | * | 8/1984 | 345/158 |

OTHER PUBLICATIONS

Jacob, "The Use of Eye Movements in Human–Computer Interaction Techniques: What You Look At is What You Get", ACM Transactions on Information Systems, vol. 9, No. 3, Apr. 1991, pp. 152–169.*

Velichkovsky, "New Technological Windows into Mind: There is more in Eyes and Brains for Human–Computer Interaction" Conference proceedings on Human factors in computing systems, 1996, pp. 496–503.*

(List continued on next page.)

*Primary Examiner*—William A. Cuchlinski, Jr.
*Assistant Examiner*—Thu Nguyen
(74) *Attorney, Agent, or Firm*—Steven G. Lisa

(57) ABSTRACT

A system for controlling the automatic scrolling of information on a computer display. The system includes a computer display, a computer gimbaled sensor for tracking the position of the user's head and user's eye, and a scroll activating interface algorithm using a neural network to find screen gaze coordinates implemented by the computer. A scrolling function is performed based upon the screen gaze coordinates of the user's eye relative t activation area(s) on the display. The gimbaled sensor system contains a platform mounted at the top of the display. The gimbaled sensor system tracks the user's head and eye allowing the user to be free from attachments while the gimbaled sensor system is tracking, still allowing the user to freely move his head. A method of controlling automatic scrolling of information on a display includes the steps of finding a screen gaze coordinate on the display of the user determining whether the screen gaze coordinate is within at least one activated control region, and activating scrolling to provide a desired display of information when the gaze direction is within at least one activated control region. In one embodiment, the control regions are defined as upper control region, lower region, right region and left region for controlling the scrolling respectively in downward, upward, leftward and rightward directions. In another embodiment, control regions are defined by concentric rings for maintaining the stationary position of the information or controlling the scrolling of the information towards the center of the display or screen.

7 Claims, 18 Drawing Sheets

U.S. PATENT DOCUMENTS

| | | | |
|---|---|---|---|
| 4,303,394 A | 12/1981 | Berke et al. | 434/40 |
| 4,373,787 A | 2/1983 | Crane et al. | 351/210 |
| 4,513,317 A | 4/1985 | Ruoff, Jr. | 358/133 |
| 4,568,159 A | 2/1986 | Baldwin | 351/210 |
| 4,582,403 A | 4/1986 | Weinblatt | 351/210 |
| 4,585,011 A | 4/1986 | Broughton et al. | 128/733 |
| 4,613,219 A | 9/1986 | Vogel | 351/209 |
| 4,648,052 A | 3/1987 | Friedman et al. | 364/550 |
| 4,659,197 A | 4/1987 | Weinblatt | 351/210 |
| 4,702,575 A | 10/1987 | Breglia | 351/210 |
| 4,735,498 A | 4/1988 | Udden et al. | 351/210 |
| 4,836,670 A | 6/1989 | Hutchinson | 351/210 |
| 4,848,340 A | 7/1989 | Bille et al. | 128/303.1 |
| 4,852,988 A | 8/1989 | Velez et al. | 351/210 |
| 4,950,069 A | 8/1990 | Hutchinson | 351/210 |
| 4,958,925 A | 9/1990 | Ober et al. | 351/210 |
| 4,973,149 A | 11/1990 | Hutchinson | 351/210 |
| 4,988,183 A | 1/1991 | Kasahara et al. | 351/210 |
| 5,048,947 A | 9/1991 | Linde | 351/224 |
| 5,070,883 A | 12/1991 | Kasahara | 128/745 |
| 5,150,137 A * | 9/1992 | Owens, II et al. | 351/210 |
| 5,196,872 A | 3/1993 | Beesmer et al. | 351/208 |
| 5,196,873 A | 3/1993 | Yamanobe et al. | 351/210 |
| 5,204,703 A | 4/1993 | Hutchinson et al. | 351/210 |
| 5,210,554 A | 5/1993 | Cornsweet et al. | 351/206 |
| 5,293,187 A | 3/1994 | Knapp et al. | 351/210 |
| 5,311,220 A * | 5/1994 | Eichenlaub | 348/55 |
| 5,331,149 A | 7/1994 | Spitzer et al. | 250/221 |
| 5,336,215 A | 8/1994 | Hsueh et al. | 606/4 |
| 5,345,281 A | 9/1994 | Taboada et al. | 351/210 |
| 5,367,315 A * | 11/1994 | Pan | 345/156 |
| 5,410,376 A | 4/1995 | Cornsweet et al. | 351/210 |
| 5,422,689 A | 6/1995 | Knapp et al. | 351/208 |
| 5,434,591 A | 7/1995 | Goto et al. | 345/123 |
| 5,455,601 A * | 10/1995 | Ozaki | 345/156 |
| 5,471,542 A | 11/1995 | Ragland | 382/128 |
| 5,481,622 A | 1/1996 | Gerhardt et al. | 382/103 |
| 5,491,492 A | 2/1996 | Knapp et al. | 345/8 |
| 5,625,782 A * | 4/1997 | Soutome et al. | 395/341 |
| 5,731,805 A * | 3/1998 | Tognazzini | 345/156 |
| 5,798,749 A * | 8/1998 | Minematsu et al. | 345/123 |
| 5,850,211 A * | 12/1998 | Tognazzini | 345/123 |
| 5,912,721 A * | 6/1999 | Yamaguchi et al. | 351/210 |
| 6,067,069 A | 5/2000 | Krause | 345/123 |
| 6,127,990 A | 10/2000 | Zwern | 345/8 |

OTHER PUBLICATIONS

Baker, "Mosaic–Surfing at Home and Abroad", proceedings of the 22nd ACM SIGUCCS conference on the User Services, 1994, pp. 159–163.*

International Publication No. WO 93/14454; A Sensory Integrated Data Interface; Nappi; Clas G06F 3/00, Jan. 8, 1993.*

Cleveland, Dixon and Nancy, "Eyegaze Eyetracking System," Jan. 1992, Internet address: http//www.1ctinc.com/doc/ecs.htm, LC Technologies.

Cleveland, Nancy R., and Doyle, Peggy G. "Eyegaze Computer System How Does It Work? Who Can Use It?," Oct. 1992, Internet address: http//www.1ctinc.com/doc/ecs.htm, LC Technologies.

Chapman, James E. M.D. and Cleveland, Nancy R., "The Eyegaze System and Cognitive Recognition and Therapy," Sep. 1991, Internet address: http//www.1ctinc.com/doc/ecs.htm, LC Technologies.

Chapman, James E. M.D., "Use of an Eye–Operated Eyegaze Computer System in Locked–In Syndrome," Mar. 1991, Internet address: http//www.1ctinc.com/doc/ecs.htm, LC Technologies.

Lahoud, Joseph A. and Dixon Cleveland, "The Eyegaze Eyetracking System Unique Example of a Multiple–Use Technology," May 1994, Internet address: http//www.1ctinc.com/doc/ecs.htm, LC Technologies.

Lahoud, Jettie, "The Eyegaze System," Internet address: http//www.1ctinc.com/doc/ecs.htm, LC Technologies.

Cleveland, Nancy R., "Eyegaze Human Computer Interface for People With Disabilities," Apr. 1994, Internet address: http//www.1ctinc.com/doc/ecs.htm, LC Technologies.

LC Technologies, Inc., "The Eyegaze Communication System," Jan. 1995, Internet address: http//www.1ctinc.com/doc/ecs.htm, LC Technologies.

LC Technologies, Inc., "The Eyegaze Development System A Tool for Human Factors Applications," Jan. 1995, Internet address: http//www.1ctinc.com/doc/ecs.htm, LC Technologies.

"Special Issue on Neural Networks II: Analysis, Techniques & Applications," *Proceedings of the IEEE*, vol. 78, No. 10, Oct. 1990.

Lippmann, Richard P., "An Introduction to Computing with Neural Nets," *IEEE ASSP Magazine*, pp. 4–22, Apr. 1987.

Rekimoto, "A Vision–Based Head Tracker For Fish Tank Virtual Reality: VR Without Head Gear," *IEEE Virtual Reality Annual International Symposium*, Feb., 1995.

Widrow, Lehr, "30 Years of Adaptive Neural Networks: Perceptron, Madaline, and Backpropagation," *Proceedings of the IEEE*, vol. 78, No. 9, pp. 1415–1442, Sep. 1990.

* cited by examiner

HEAD/EYE-TRACK SYSTEM: NO USER ATTACHMENT

EYE-TRACK SYSTEM:
(OPTIONALLY TRANSPARENT)

ATTACHED

UN-ATTACHED

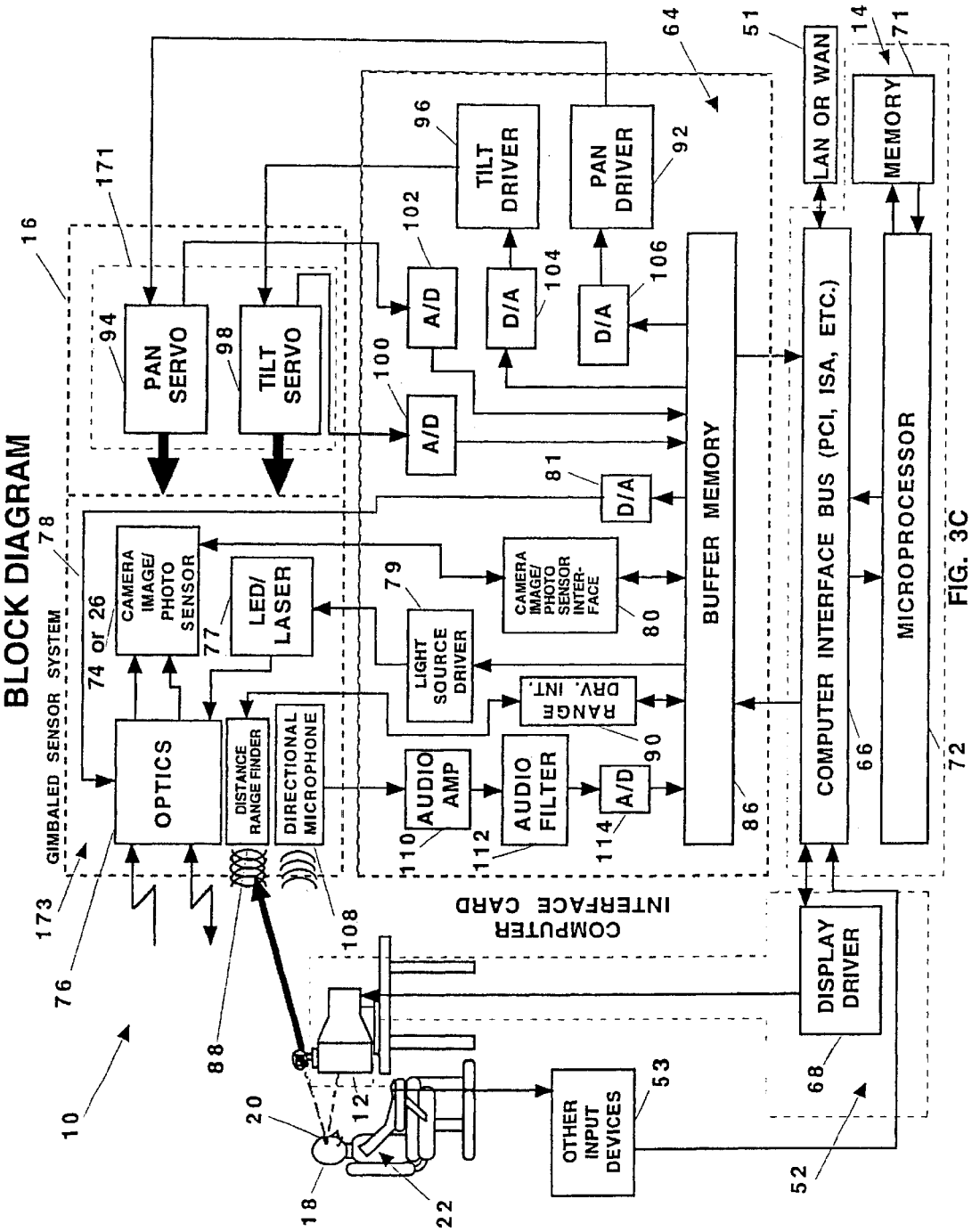

DISPLAY SCREEN: EYE SCROLL EXAMPLE

DISPLAY SCREEN: EYE SCROLL CONTROL REGIONS

SYSTEM AND METHODS FOR CONTROLLING AUTOMATIC SCROLLING OF INFORMATION ON A DISPLAY OR SCREEN

FIELD OF THE INVENTION

This invention relates to a computer interface system and methods and their method of use, and, more particularly, to a computer interface system and methods for controlling automatic scrolling of information on a display or screen.

BACKGROUND OF THE INVENTION

Prior Conventional Computer Mouse Devices

Computer interfaces such as mouses, track balls, light pens, etc. are devices that provide users with a way of controlling and manipulating the display of information, data, text, and images on a computer screen or monitor. Computer mouses have become a common and widely used device of present computer systems. It is well known that a mouse typically has a roller ball placed inside a hand-held housing wherein the ball rolls along a surface and the ball also rolls against directional control contacts to allow a user to move a cursor within a screen or monitor. The housing also usually has buttons on the top side for the user to activate user selection or to manipulate the display of information, data, text, images, etc. However, mouses require the use of hand or manual manipulation by the user and have the disadvantages in that they require the use of a hand in order to be controlled. The disadvantages become evident when the user is in an environment which requires the simultaneous use of hands for other purposes (i.e typing on a keyboard) or requires a hands-free environment or the user is physically challenged or handicapped as to the use of his or her hands.

Prior Eye Mouse Devices With Eye Cursor Control and Manual or Foot Activation or Selection Eye controlled devices have been developed to control the movement of a cursor on a computer screen or display. These devices allow the user to move the cursor by moving his or her eyes, and these devices accomplish the movement of the cursor by tracking the movement of the eyes of the user. However, some of these devices still require manual or foot activation or selection to control the display of information, text, images, data, etc. An example of an eye controlled device with manual or foot activation or selection is seen in U.S. Pat. No. 5,367,315. These type of devices still have the main disadvantage in that they require the use of a user's hand in order to be controlled. Therefore, these devices are still not well suited for users that require a hands-free environment nor are they well suited to those users who are physically challenged.

Prior Eye Mouse Devices With Eye Cursor Control and Dwell or Gaze Time Activation or Selection Eye mouse devices have been further developed so that the movement of a cursor on a computer screen or display is controlled by the movement of the user's eyes and, furthermore, activation or selection is accomplished by the user dwelling, gazing, or staring at a desired activation region for a pre-determined amount of time. For example, this type of device is controlled by the user moving his or her eyes to a desired area on the computer screen or display and the user stares, dwells, or gazes at an activation region for a pre-determined amount of time to activate menus or make selections or open windows, etc. Examples of eye mouse devices that have the features of an eye cursor control and dwell or gaze time activation or selection are seen in U.S. Pat. Nos. 4,836,670; 4,950,069; 4,973,149 and 5,345,281. This type of device allows a user to control both the movement of the cursor and the activation or selection of menus, windows, text, data, information, or images. However, in order to control the scrolling of information, data, text, or images on the display or screen with this type of device, the user will need to dwell, stare, or gaze at a scroll bar, page up or page down activation region, etc. The problem with this type of control of scrolling is that it is slow and requires the user to wait at least the pre-determined amount of time before scrolling is activated and implemented. Therefore, there is a need for and it is an object of the present invention to provide a device for controlling via the user's eye(s) the automatic scrolling of information, data, images, text, etc. on a computer screen or display.

Prior Eye Tracking Devices (Video or Image Processing)

It is well known that video or image processing has been used to track the movement of the user's eye(s) for the purposes of controlling the cursor on a computer display or screen. Examples of this type of video or image processing for eye tracking purposes are demonstrated in U.S. Pat. Nos. 4,648,052; 5,331,149; 5,471,542; 4,513,317 and 5,481,622. One of the problems with the eye tracking devices for eye controlled computer devices is that normally a mechanism is required to be attached to the user in order to track the movement of the user's eye(s). Users, however, typically prefer not to have attachments on them in order to operate a computer peripheral since these attachments are usually uncomfortable to wear or they are not aesthetically pleasing, fashionable or ergonomic.

Non-attached eye tracking devices for controlling a cursor on a display or screen have been developed. An example of such a non-attached device is seen in the prior art systems developed by LC Technologies at the World Wide Web site http://www.lctinc.com/doc/ecs.htm. However, a problem with these non-attached eye tracking devices is that they only allow or restrict the movement of the user's head within a limited range since the hardware has to be directed or aimed within the range or vicinity of the user's eye.

Therefore, there is a need for a device that tracks the eye of the user for allowing the control of a cursor on a display or screen and that does not restrict or limit the movement of the user's head, when the device is not in anyway attached to the user.

Manipulation of Three Dimensional Images on a Screen or Display

It is also known that devices which track the position of the eye of a user and that use the corresponding positional signals to control three dimensional images on a computer, video game, or other apparatus exist in the prior art. These devices use eye tracking to control the three dimensional imagery and allows the user via eye movement and/or dwell time to jump levels, move to another display via selection menus and/or buttons on a display screen, move virtual objects forwards and backwards, etc. Examples of these types of devices are seen in U.S. Pat. Nos. 5,293,187; 5,422,689 and 5,491,492. However, these devices also do not in any way teach or suggest the control of automatic scrolling of a computer display or screen.

The Need for Automatic Scrolling Devices

Many applications and uses exist that require a user to be in a hands-free environment or in which the user does not have the benefit of the use of his or her hands (i.e. physically challenged, handicapped, etc.). Furthermore, scrolling of text, data, images, information, etc. on a display or screen is inherently needed for word processing, reading information (i.e. CD-ROM books), performing textual searches, viewing images, observing real time data (i.e. air traffic control, satellite weather pictures, etc.), etc. For example, users of word processing software for a computer system need to scroll the text line by line or page by page in order to read, scan, manipulate, or edit the text, data, information, etc. on the display or screen. Another example is a medical doctor who is performing medical procedure(s) or surgery and who would benefit from having a device that allows him or her to continue the medical or surgical procedure (i.e. keep his or her hands on the procedure) and can manipulate and scroll images or text (i.e. view CAT Scan, X-Ray Images, Patient Charts or Files; reference Medical Text Books; etc.) or control the field of view and magnification of an imaging device on a heads-up display or screen with the use of the doctor's eyes. (See Lemelson and Hiett application entitled "A SELECTIVELY CONTROLLABLE HEADS-UP DISPLAY SYSTEM AND METHOD FOR PRESENTING DESIRED MEDICAL INFORMATION AND/OR IMAGE (S)", Ser. No. 08/720662; Filing Date Oct. 2, 1996). Further examples are automobile mechanics that are performing work on an automobile or an electrical technician or assembly-line worker that is working on a circuit board or other product or apparatus who may need to simultaneously or briefly refer to a manual, special instructions, or other pertinent information during the performance of their work wherein this information or data can be accessed on a computer display or screen. Therefore, the need for a device for controlling the automatic scrolling of information, data, images, text, etc. on computer display or screen that allows the user to have his or her hands free to do other desired tasks, and it is an object of the present invention to provide such a device.

Notwithstanding the large number of articles and patents issued in the area of eye mouses or eye controlled interfaces for computer systems, there has been no such device that is not highly restrained, if unattached by the position of the user's head for providing automatic control of scrolling of the information, data, or display, especially the automatic eye control of scrolling of information, data, or display. The device can be designed for the special needs of individuals that require a hands-free environment or who are physically challenged or handicapped. Such a device would be extremely useful to personnel working in the fields of medicine, assembly lines, automobile service stations, electronics assembly, or any other environments that require the performance of manual procedures and also have to simultaneously reference information data, information, images, text, etc. Presently, there is a need for a hands free eye controlled scrolling device for computer systems. There is a further need to provide an automatic scroll control device for automatically scrolling the display of information, text, data, images, etc. on a computer display or screen to provide a hands-free environment resulting in convenience and efficient access of related information to the user.

OBJECTS OF THE INVENTION

One object of this invention is a system for controlling automatic scrolling of information on a display or a screen that includes a computer system coupled to the display or the screen, an eye, head tracking, and/or speech scroll control sensor system coupled to the computer system for tracking and determining a gaze direction of the eye of a user relative to the display or the screen, and a gimbaled sensor system coupled to an interface card attached to a computer system for implementing automatic scrolling based upon the gaze direction of the eye of the user relative to an activation area on the display or the screen.

Another object of this invention is the gimbaled sensor system having an eye tracking system for tracking the eye of the user and an eye gaze direction determining system for determining the gaze direction of the eye of the user relative to the display or the screen.

Another object of this invention is that the gimbaled sensor system is coupled to a computer system for tracking and determining the position of the eye of a user and a position of the head of the user relative to the display or the screen.

A further object of this invention is the gimbaled sensor system having a camera or photo sensor for providing images of the head and the eye of the user, a zoom lens coupled to the camera or photo sensor for focusing the camera or photo sensor at the user, and optics coupled to the camera or photo sensor for aiding the camera or photo sensor in detecting or providing images of the head and the eye of the user so that the images can be processed by the computer system.

Another object of the invention is to allow the control of information on a display or a screen by a user that includes the steps of finding a gaze direction on the display or the screen of the user, determining the screen or display coordinates of which the user is focused on and whether the coordinates are within at least one control region, and thereby activating scrolling to provide a desired display of information when the screen gaze direction is within the at least one activated control region.

Another object of this invention is that the step of finding a gaze screen coordinate on the display or the screen surface further includes the steps of detecting a user that is closest to the display or the screen, focusing and magnifying a field of view of a camera on an eye of the user to provide a magnified image of the eye, and reading the magnified image into a computer system, determining physical coordinates of a center of a cornea of the eye and a glint (projected by a light source from gimbaled sensor system) center of the eye, determining a vector between the center of the cornea and a glint center on the sensor image, calculating screen gaze coordinates of the user, and sending the screen gaze coordinates to the computer system for processing by an application program for controlling the scrolling or selection of information on the display or the screen.

Another object of this invention is that the step of focusing and magnifying a field of view of a camera on an eye of the user further includes the steps of determining a correction vector for re-centering the camera to adjust the field of view and zooming the field of view of the camera onto the center of an eye of the user.

A still further object of this invention is that the step of determining whether the screen gaze coordinates is within at least one activated control region further includes the steps of determining whether the screen gaze coordinates is within an upper horizontal rectangular region, a lower horizontal rectangular region, a right vertical rectangular region, a left vertical rectangular region, or within an overlapping area of two regions, and scrolling the information respectively downwards, upwards, leftwards, rightwards, or in the corresponding two directions, depending on the screen gaze coordinates and scrolling the information at a rate defined by the screen gaze coordinates.

Another object of this invention is that the step of determining whether the screen gaze coordinates is within at least one activated control region further includes the steps of determining whether the screen gaze coordinates is within a static region defined by at least one of a number of concentric circles, determining whether the gaze direction is within an activated control region defined by another of the number of concentric circles, and activating scrolling to provide a desired display of information so that the region at which the screen gaze coordinates of the user is directed is moved to a center of the display or the screen at a rate that is defined for the concentric circle at which the screen gaze coordinates of the user is directed.

A still further object of this invention is that the step of determining whether the screen gaze coordinates is within an activated control region defined by another of the number of concentric circles further includes the steps of calculating a radius and an angle with respect to a center of the number of concentric circles to define a screen gaze vector, calculating horizontal and vertical scroll rates based on the gaze vector, and scrolling the information on the display or the screen in the horizontal and the vertical directions based on the calculated horizontal and vertical scroll rates.

A further object of this invention is that the step of determining whether the screen gaze coordinate is within an activated control region defined by another of the number of concentric circles further includes the steps of determining whether the gaze direction is within an activated control quadrant wherein the information on the display or the screen is moved downward and leftward; or upward and leftward; or upward and rightward; or downward and rightward.

A further object of this invention is a method of making a system for controlling automatic scrolling of information on a display or a screen that includes the steps of providing a computer system coupled to the display or the screen, coupling a gimbaled sensor system to a computer system for tracking and determining the eye gaze direction of a user relative to the display or the screen, and coupling a scroll activating interface system to the computer system and interfacing the scroll activating interface system with the gimbaled sensor system for implementing automatic scrolling based upon the calculated screen gaze coordinates of the eye of the user relative to an activation area on the display or the screen.

A further object of this invention is the step of coupling an eye scroll control sensor further includes the step of coupling an eye and head scroll control sensor to the computer system for tracking and determining the position of the head of the user relative to the display or the screen.

A further object of this invention is that the step of coupling a gimbaled sensor system further includes the step of coupling a head sensor to the computer system for tracking the position of the head of the user relative to the display or the screen.

A further object of this invention is to provide a system for controlling the automatic scrolling of information on a display or a screen that allows the user to be able to freely use his or her hands to perform other tasks, procedures, work, etc.

Another object of this invention is to provide a system for controlling the automatic scrolling of information on a display or a screen that tracks the user's eye, allows the user to be free from any attachments while the system is eye tracking, and that still allows the user to freely move his or her head when the system is in use. A further object of this invention is to provide a system for controlling the automatic scrolling of information on a display or a screen that can be used in various and a wide range of applications such as for medical personnel, technicians, assembly line workers, weather persons, air traffic controllers, etc.

Further objects, features, and advantages of the invention will become evident in light of the following detailed description considered in conjunction with the referenced drawings of a preferred exemplary embodiment according to the present invention.

BRIEF DESCRIPTION OF FIGURES

FIG. 3C is a block diagram of a more specific eye control system hardware for tracking the user's head and eye wherein the system uses a head/eye gimbaled sensor system which include pan/tilt servos for accomplishing the head tracking.

FIG. 6B depicts a front view of a display or screen that is used for scrolling information, images, or text at which the user is gazing at the bottom right rectangular control region of the display or screen.

FIG. 6C depicts a front view of a display or screen that has the information, images, or text in the display or screen of FIG. 6B scrolled upwards and to the left.

DETAILED DESCRIPTION OF THE INVENTION

The present invention of this application is better understood in conjunction with the following detailed description of the Figures and the preferred embodiment. The various hardware and software elements used to carry out the invention are illustrated in the attached drawings in the form of flow charts and block diagrams. For simplicity and brevity, the Figures, and Specification do not address in detail features that are well known in the prior art, such as the literature listed in the Background of the Invention above and certain additional prior art which is discussed in the Detailed Description that follows. However, to assure an adequate disclosure, the specification hereby incorporates by reference each and every patent and other publication referenced above in the Background of the Invention or mentioned in the Detailed Description below.

I. Overall System and Applications of System

A. Automatic Scrolling for a Computer Display or Screen

Figure 1A:
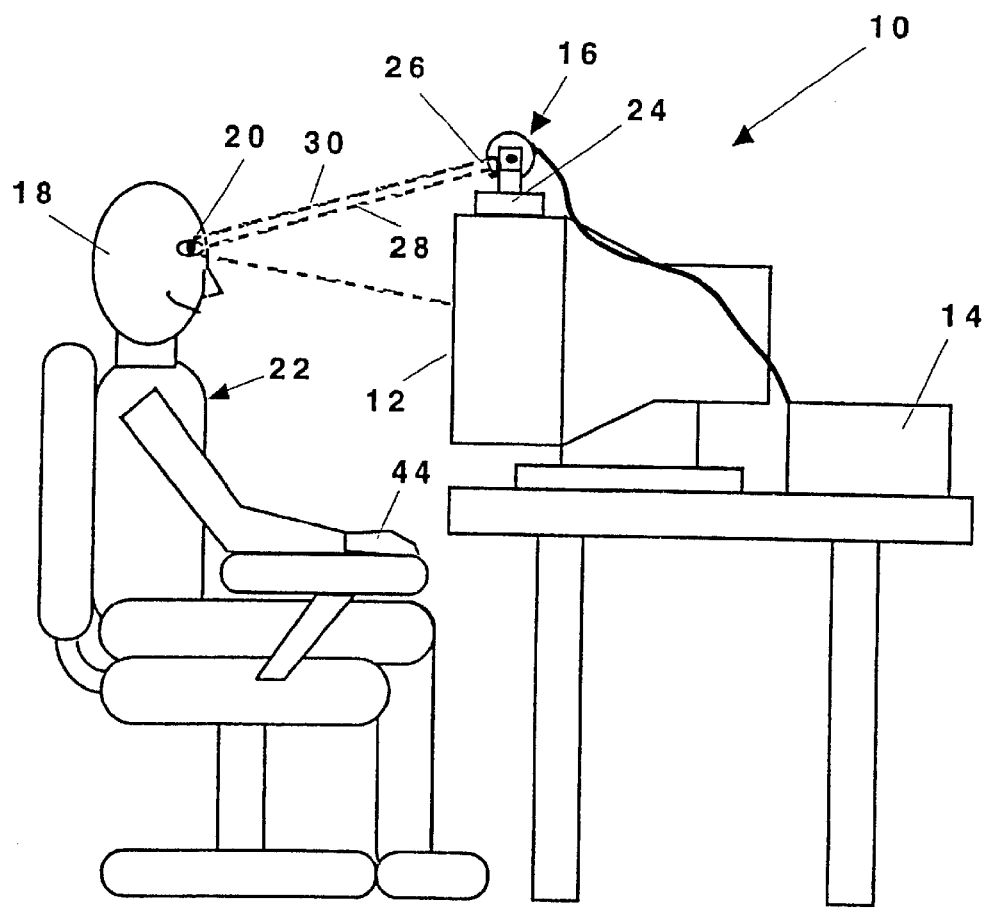
FIG. 1A depicts a side view of an example system for controlling the automatic scrolling of information on a computer display or screen.

In a preferred form of the invention as seen in FIG. 1A, a human machine interface system 10 for controlling the automatic scrolling of information on a computer display or screen 12 is shown. The human machine interface system 10 generally includes a computer display or screen 12, a computer system 14, gimbaled sensor system 16 for following and tracking the position and movement of the user's head 18 and the user's eye 20, and a scroll activating interface algorithm implemented by the computer system 14 so that corresponding scrolling function is performed based upon the gaze direction of the user's eye 20 used to calculate screen gaze coordinates relative to a certain activation area(s) on the display or screen 12. In FIG. 1A, the user 22 sits in front of the computer display or screen 12, and the user 22 stares at certain area(s) on the display or screen 12.

B. Applications for Automatic Scrolling

Figure 1B:
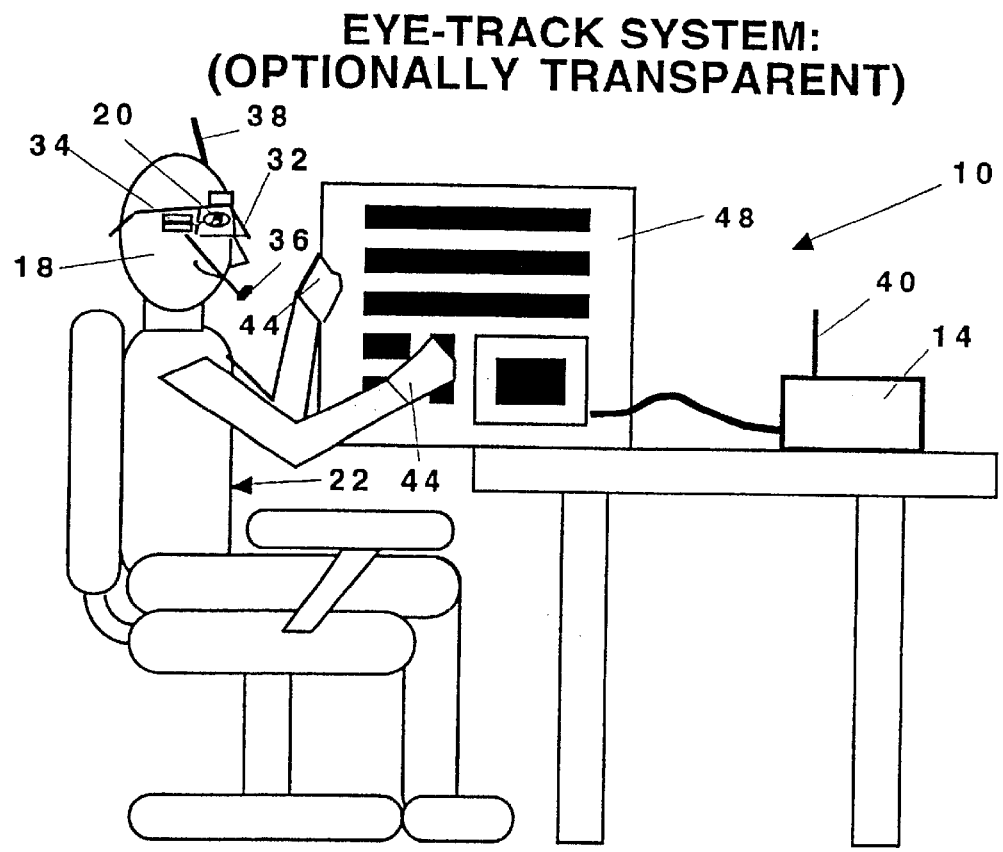
FIG. 1B depicts a side view of an example system that is used with a head mounted (attached) device or glasses worn by the user wherein the user is able to perform tasks that require the use of hands (i.e. a technician working on a circuit board).
Figure 1C:
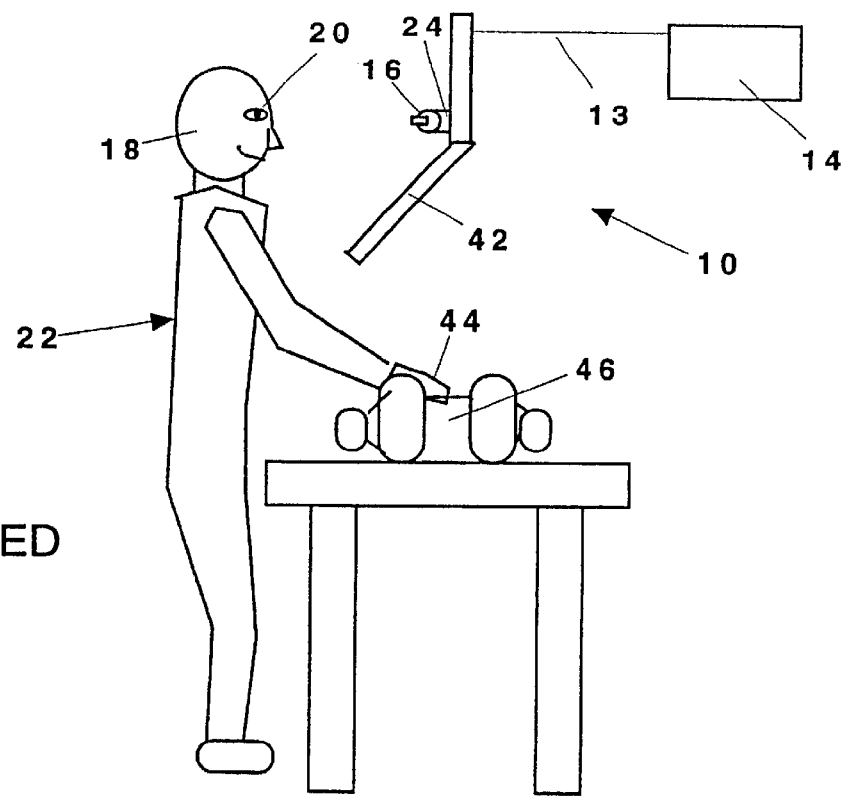
FIG. 1C depicts an automatic scrolling control system that is used with a non-attached screen or display of which may be transparent and wherein the screen or display provides hands-free, heads-up medical information to the user (i.e. the control of scrolling of medical heads-up display or screen information).

FIG. 1A shows that the automatic scrolling control system 10 is used for controlling information on a computer display or screen 12. FIG. 1B shows that the automatic scrolling control system 10 is used with a head mounted display or pair of display glasses 32. The head mounted device or glasses 32 is worn by the user 22, and the user 22 is able to perform tasks that require his/her hands 44 (i.e. FIG. 1B specifically shows user 22 working on a circuit board 48 while still able to control the display of information with their eye 20). The head mounted display 32 can also be a medical heads up display as shown in FIG. 1C wherein a doctor, shown as the user 22, performs a medical or surgical procedure on a patient 46 while still able to control the display of information on the display or screen 42 with the user's eye 20 (i.e. not shown, but see Lemelson and Hiett application entitled "A SELECTIVELY CONTROLLABLE HEADS-UP DISPLAY SYSTEM AND METHOD FOR PRESENTING DESIRED MEDICAL INFORMATION AND/OR IMAGE(S)", Ser. No. 08/720662; Filing Date Oct. 2, 1996). FIG. 1C also shows the automatic scrolling control system 10 used with a non-attached screen or display 42 wherein the screen or display 42 provides heads-up display of medical information while the user 22 (i.e. medical doctor) performs a medical or surgical procedure on a patient 46. However, there are many other applications that exist in which the present application may be utilized, and the present invention is not limited to the applications, ways, or methods of implementation that the present invention is used as shown in FIGS. 1A, 1B, and 1C.

FIG. 1A shows that the head and eye tracking gimbaled sensor system 16 is not in any way attached to the user 22. The head and eye tracking system 10 includes a gimbaled sensor system 16 which includes a positionally-controlled, gimbaled platform 24 that is shown mounted at the top of the display or screen 12. The gimbaled sensor system 16 senses the position of the user's head 18 via a sensor view path 28 as shown in FIG. 1A, and the gimbaled platform 24 moves the gimbaled sensor system 16 with camera(s) 26 according to the position of the user's head 18 and centers the focus of the gimbaled sensor system 16 with camera 26 generally onto the user's eye 20 via camera line of sight 30. The centering of the focus of the camera(s) 26 can be achieved by image processing, facial recognition, or any other suitable method. One such method of head tracking is disclosed in Rekimoto, "A Vision-Based Head Tracker For Fishtank Virtual Reality: VR Without Head Gear", IEEE Virtual Reality Annual international Symposium '95 (VRAS '95), 1995. A process such as image processing, pupil recognition, or any other suitable method is further used to determine the position at which the user's eye 20 is focused onto the display or screen 12. However, any suitable device that can track the movements of the head and eye of the user may be utilized for carrying out the purposes of the present invention which is not limited to the ways shown in FIG. 1A.

B. Automatic Scrolling for a Head-Mounted Device

FIG. 1B shows another embodiment of the present human machine interface system 10 in the form of a transparent screen or display 32 that is mounted to the head 18 of the user 22 shown as an electronic technician. The head-mounted screen or display 32 is in the shape of glasses that is mounted over the user's eyes 20, and it has eye tracking sensors 34 and a microphone 36 mounted on one side of the glasses and a radio antennae 38 mounted on the opposite side of glasses. The head-mounted display or screen 32 provides a hands-free environment for the user 22 to perform other tasks with hands 44 free while allowing the user 22 to control the scrolling of information on the screen or display 32 with the use of the user's eye(s) 20 and/or in combination with voice command. The head-mounted screen or display 32 is coupled via wireless communication with computer system 14 by head mounted antenna 38 and computer mounted antennae 40.

However, any suitable devices, components, or apparatuses that mount to the user's head 18 may be utilized for carrying out the purposes of the present invention which is not limited to the ways shown in FIG. 1B.

One method of providing the eye tracking function for the head-mounted display or screen 32 is by the use of a low power laser that generates an infrared eye-tracking laser beam. The laser beam is projected through a lens and reflected by a mirror onto the user's eye 20. The user's eye 20 include a sclera, cornea, and pupil. When the user's eye 20 move, the eye components cause distortions in the infrared laser beam, which are reflected back onto the mirror, and then through a lens into an infrared photo detector, infrared camera, or other type of photo detector. This distortion of the laser beam corresponds to the eye direction vector which can be measured accurately by eye-tracking electronics. Data defining the eye direction vector is subsequently transmitted from the eye-tracking electronics to the command computer 14 through wireless communication (i.e. computer transceiver antenna 40 and 38 head mounted antenna). However, any suitable devices, components, or apparatuses for tracking the movements of the user's eyes 20 may be utilized for carrying out the purposes of the present invention which is not limited to the ways shown in FIG. 1B.

C. Automatic Scrolling for Transparent, Non-Attached Screen

FIG. 1C shows a further embodiment of the present human machine interface system 10 in the form of an optionally transparent, non-attached display or screen 42. The non-attached display or screen 42 is shown to be a flat transparent screen that is in front of the user 22. The display or screen 42 is attached to a computer 14 through cable 13, and head and eye tracking system 16 with camera 26 interface between the computer 14 and the user 22 to control the scrolling of the information on the display or screen 42. The head and eye tracking system 16 can be the same system as described for the embodiment of the present invention in FIG. 1A. However, any suitable display or screen for displaying and controlling the display of information may be utilized for carrying out the purposes of the present invention which is not limited to the ways shown in FIG. 1C. The display or screen mentioned above as a head mounted display screen 32 of FIG. 1B and non-attached display screen 42 of FIG. 1C are considered the same output display device 12, as is shown in FIG. 1A throughout the rest of the detailed description of this invention. The display device 12 may also be described as a screen 12 or display screen 12 which is used interchangeably throughout this document and is intended to have the same meaning. The display 12 may be a part of a multimedia system which is capable of producing video, making sounds, or other inputs to any of the senses of the user 22.

II. The General Automatic Scrolling System

A. The General Software Algorithm for the Automatic Scrolling System

Figure 2:
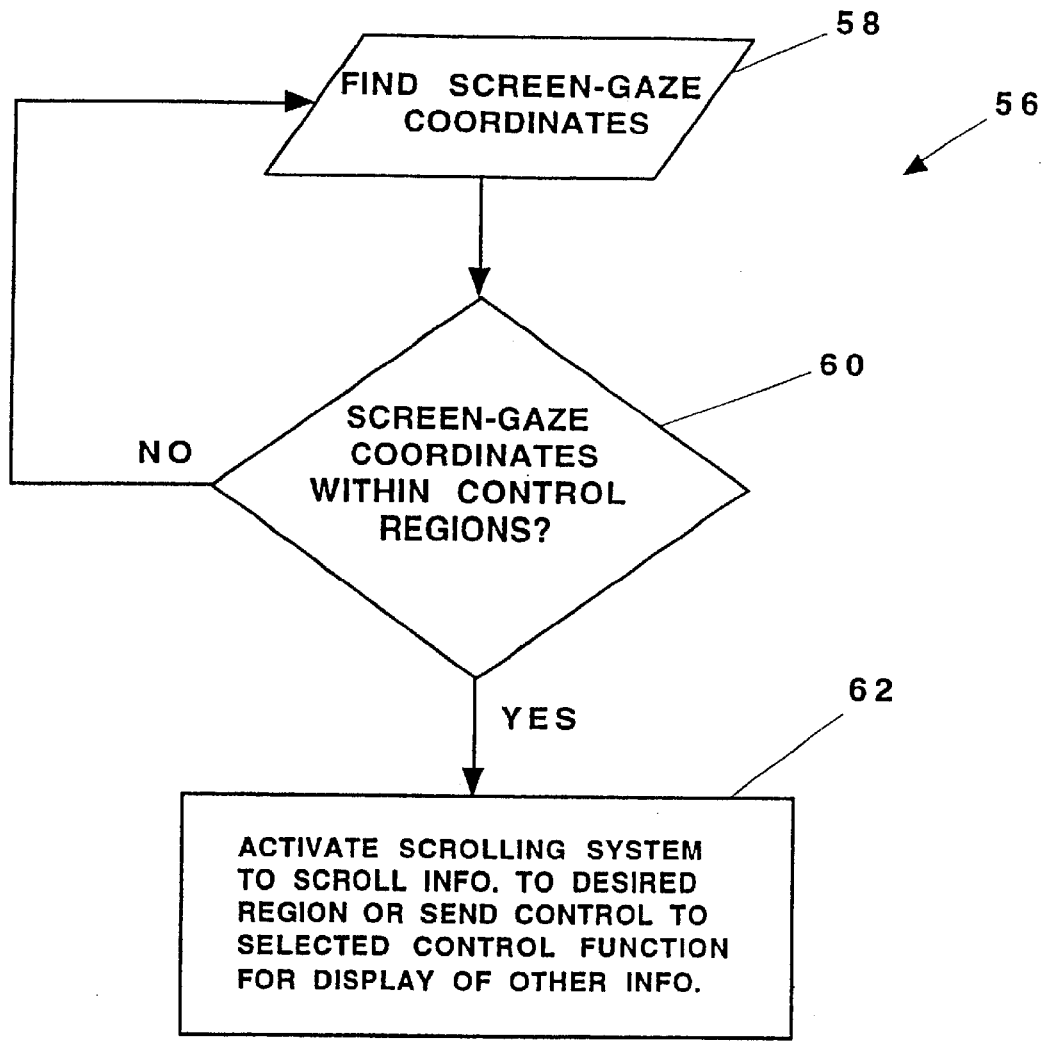
FIG. 2 is a general flow chart of the algorithm for screen gaze control that is implemented by the hardware (see FIGS. 3A, 3B, 3C).

FIG. 2 shows the block diagram 56 of the general algorithm (i.e. software algorithm) to control the automatic scrolling of information or displaying on a display 12. The algorithm includes the step at block 58 for obtaining sensor gaze coordinates from the user 22 but may also be used to find a gaze direction outside of the screen display but in the same plane as the display surface. At decision block 60, the determination is made as to whether screen gaze coordinates are within a control region (i.e. on the border or peripheral region or on a menu switch control). The control region may provide the user with the further feature of a smooth scrolling function (i.e. speed of scrolling depends on position at which the gaze of the user is on the activation region) or other type of menu selection function or feature. If the gaze measurements are not within a control region, then further gaze measurements are obtained from the user 22. If gaze measurements are within a control region, then the human-machine interface system 10 is activated to scroll the information to the corresponding location on the display 12. However, any suitable algorithm for controlling the automatic scrolling of information on a display or screen may be utilized for carrying out the purposes of the present invention which is not limited to the ways shown in FIG. 2.

B. The General Hardware for the Automatic Scrolling System

Figure 3A:
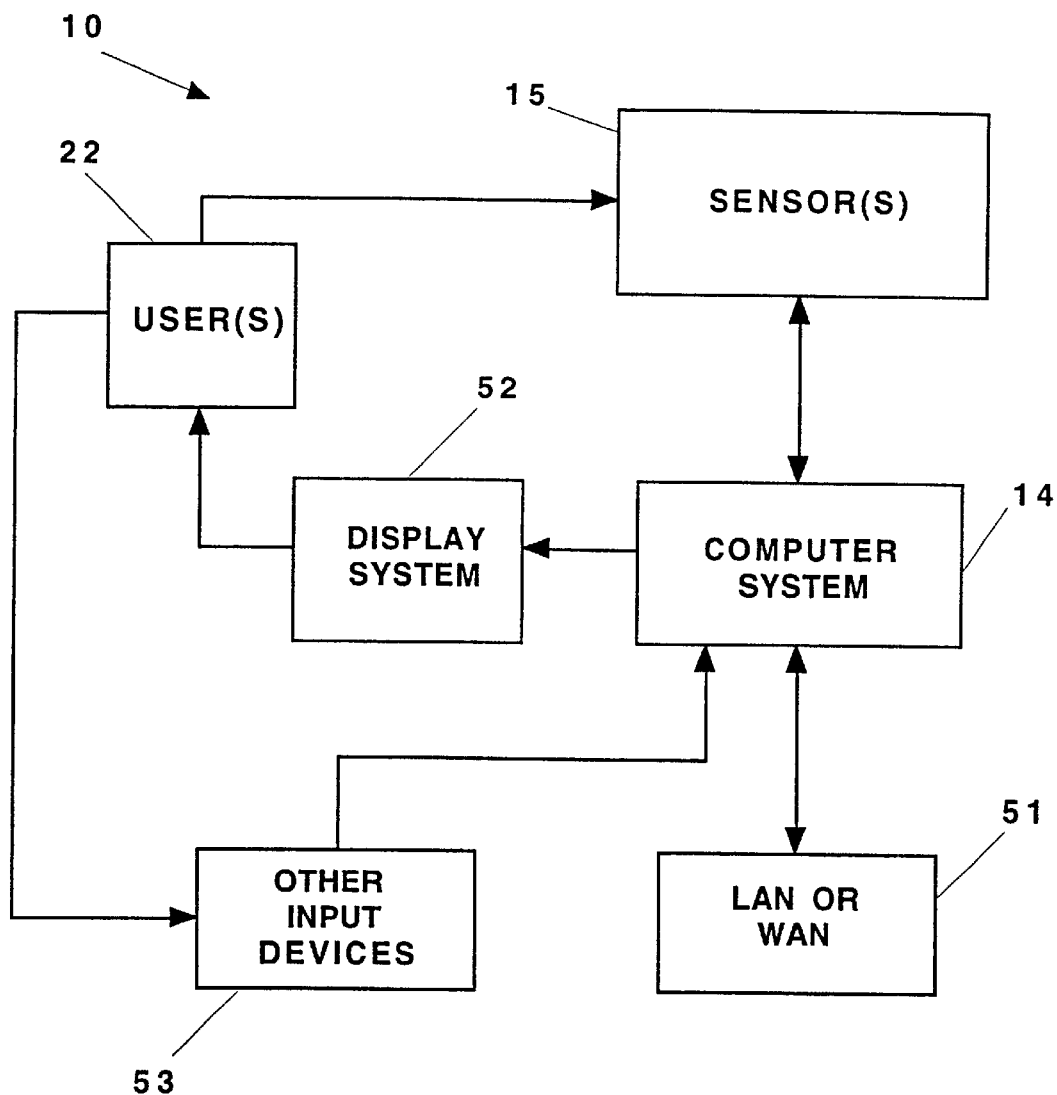
FIG. 3A is a general block diagram of the eye control computer hardware.

FIG. 3A shows a block diagram of the general hardware for the automatic scrolling control system 10. The block diagram includes a computer system 14, a display system represented at block 52 (i.e. display systems 12, 32, or 42) FIG. 1A, 1B, and 1C respectively coupled to the computer system 14, and an eye/speech scroll control sensor at block 15. The user(s) 22 interfaces with the display system 52 wherein the user 22 is in front of the display system 52 and the user 22 is glancing at the display system 52. The sensor system 15 which may be free to move on a gimbaled platform 24 (FIG. 1A and 1C) detects the position of the user's head 18 and eye 20, and the gimbaled sensor system 16 particulary the sensor system 15 interfaces with the computer system 14 to determine the position on the display system 52 at which the user 22 is gazing. The computer system 14 determines whether the user 22 is gazing at a region for activating automatic scrolling of information on the display system 52 (this gaze region may be on the displays 12, 32, or 42 of FIGS. 1A, 1B, and 1C). Also shown in FIG. 3A are other input devices 53 (i.e. key board, light pen, hand mouse, buttons, joysticks, etc.) for the user 22 to interface with the computer system 14. A LAN or WAN 51 allows the computer system 14 to access more information outside of the system for displaying on the display such as 12, 32 or 42.

However, any suitable hardware and/or software components may be utilized for carrying out the purposes of the present invention which is not limited to the ways shown in FIG. 3A.

III. Detailed Disclosure of a Specific Automatic Scrolling System

A. General Hardware for a Gimbaled Sensor System Screen Gaze Coordination for

Automatic Scrolling System

Figure 3B:
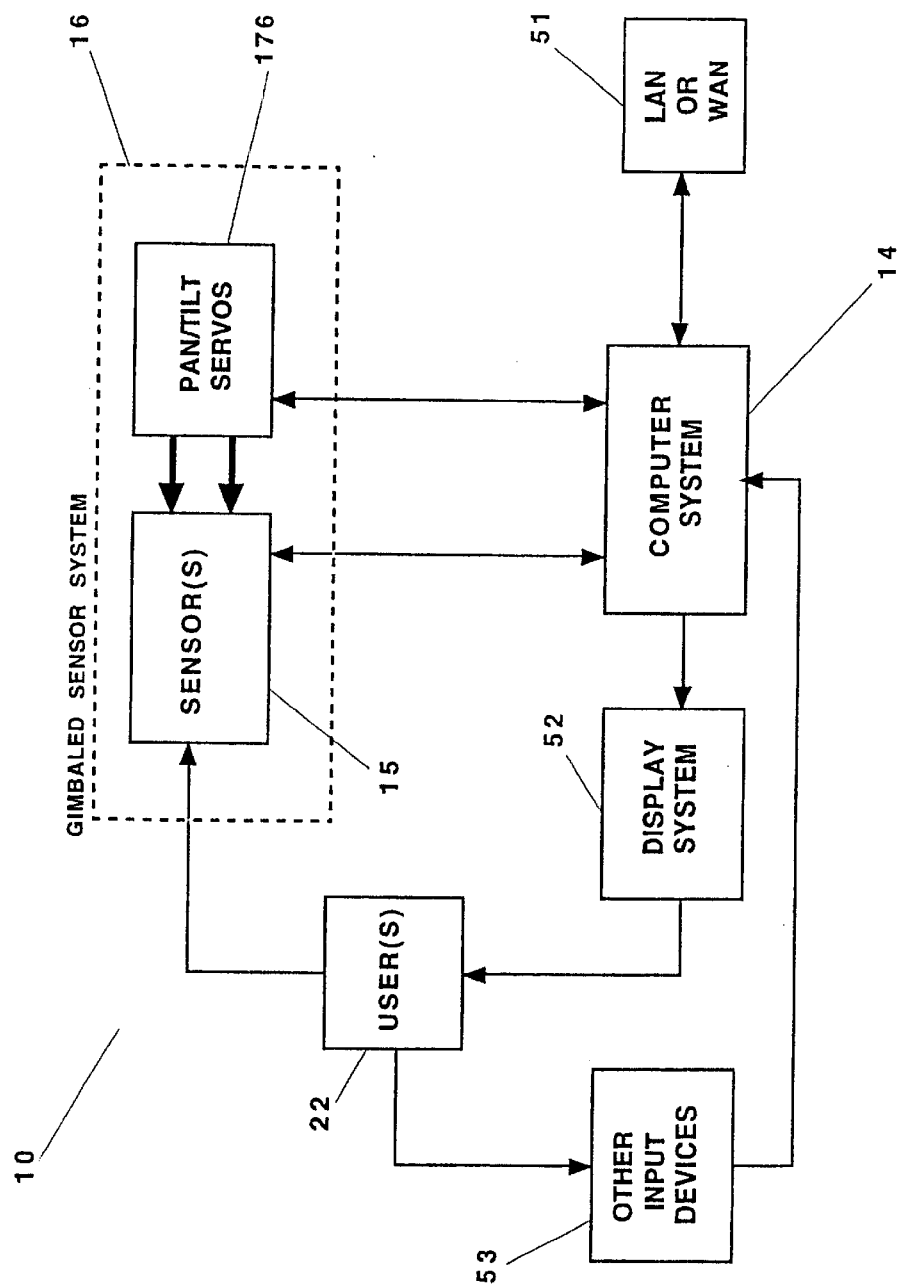
FIG. 3B is a block diagram of a specific embodiment hardware system for the screen gaze control system where the sensor is gimbaled to follow users head.

FIG. 3B shows a specific automatic scrolling system hardware 10 used for eye and head tracking that includes the use of a gimbaled sensor system 16 and pan/tilt servos represented at block 176 (i.e. pan and tilt servos 94 and 98 shown in FIG. 3C) that move the sensor(s) 15 that are components for the gimbaled sensor system 16. The computer system 14 is shown interfaced with the display system 52 (i.e. display system 12, 32, or 42), and the display system 52 is in front of the user(s) 22. A LAN or WAN 51 is also shown connected to computer system 14 for access to information on the internet. The gimbaled sensor system 16 tracks the head and eye movements of the user 22 and provides the advantage of the user 22 not having to wear or attach anything to him/herself. The overall human machine interface system 10 is able to track the movement of the user's head 18 and eye 20 thereby allowing the user 22 to control the display system 52 with his/her eye 20 and other input devices 53.

However, any suitable system for eye and head tracking and eye and speech controlling the scrolling of a display system may be utilized for carrying out the purposes of the present invention which is not limited to the components ways, and methods of implementation shown in FIG. 3B.

FIG. 3C shows a detailed hardware block diagram of the human-machine interface system 10 for the automatic scrolling and speech control of a display or multimedia system 12. The specific hardware for this system generally includes a display system 52 which includes a display driver 68 which is coupled to a computer system 14. (Here, user 22 is shown sitting in front of the display screen 12.) The computer system 14 is attached to a computer interface card 64 and a computer interface bus 66 through which it communicates with the display driver 68 (i.e. VGA card) and the gimbaled sensor system 16. The gimbaled sensor system 16 is shown to be mounted on top of the display system 12 coupled with the computer system 14. The gimbaled sensor system 16 is controlled to sense and track the position of the user's head 18, and it is also controlled to sense the position at which a user's eye 20 is gazing at the display system 12. The gimbaled sensor system 16 is coupled to the computer interface card 64 so that the screen gaze measurements and head position data is sent to the computer interface card 64 which is coupled to a computer interface bus 66 which, in turn, is coupled to a microprocessor 72 to control the display of information on the display screen 12 depending on whether the user 22 is gazing at a scroll activation region. Speech commands such as "step," "stop," "search word," "page down," "page up," "magnify," may also be used along with other input devices 53 for selecting or controlling the computer system 14 and display 12. Detection of lip movement or some other indicators, such as, nodding of the head, or waving of hands, may be detected by image processing or some other means that may be used for selecting or controlling the computer system 14 and display 12.

Referring to block 173 of FIG. 3C, the gimbaled sensor system 16 has camera(s) 26 or photo sensor(s) 74 having optics 76 and zoom control line 78 for focusing on and obtaining various images of the user's head 18 and eye 20. The camera 26 or photo sensor 74 is coupled to the computer interface card 64 via a image/photosensor interface 80. The signals from image/photo sensor interface 80 are then sent to the buffer memory 86 which is attached to computer interface bus 66. The gimbaled sensor system 16 also includes a distance range finder 88 to find the distance (between points E 176 and D 120 of FIG. 4A) from which the user's head 18 is to the gimbaled sensor system 16. The distance range finder 88 can be an ultrasonic range finder (i.e. using sound waves) for determining the distance between the user's head 18 and the gimbaled sensor system 16. The ultrasonic range finder is attached to a range driver interface 90 that activates the ultrasonic range finder, and the range driver interface 90 is coupled between the range finder 88 and a buffer memory 86 in the interface card 64. The distance is detected and determined, and the value of this distance is sent to the buffer memory 86. Alternatively, the distance range finder 88 can be a laser range finder. The laser range finder is attached to a range driver interface 90 that activates the laser range finder, and the range driver interface 90 is coupled between the range finder 88 and a buffer memory 86 to the computer interface bus 66 (i.e. ISA, PCI bus, etc.). Commands from the computer system 14 via the buffer memory 86 control the range driver 90 to drive the distance range finder 88 (Other range finding devices may also be used) to determine the distance between the user's head 18 and the gimbaled sensor system 16. The distance is then measured, and the value of this distance is sent to the buffer memory 86.

The gimbaled sensor system 16 is attached to the computer interface card 64 via pan driver 92, and the pan driver 92 applies the appropriate voltage to a pan servo 94 to control the pivotal movement β(beta) 177 (i.e. see FIG. 4A in the XZ phase) in the horizontal direction. The gimbaled sensor system 16 is also attached to the computer interface card 64 via tilt driver 96, and the tilt driver 96 applies the appropriate voltage to the tilt servo 98 to control the vertical pivotal scanning movement α(alpha) 175 (i.e. see a 175 in FIG. 4A on a plane parallel to the Y axis 192). The pan and tilt drivers 92 and 96 each control a respective servo-motor, stepper motor or actuator that moves or controls the associated gimbaled sensor system 16. The pan and tilt servos 94 and 98 allow movement or rotation of the gimbaled sensor system 16 to track the position of the head 18 of the user 22. The angular position (i.e. pan and tilt angles β 177 and α 175 respectively) of the gimbaled sensor system are converted from analog values to digital values via analog to digital ("A/D") converters 100 and 102, and the corresponding digital values are sent to the memory buffer 86. Commanded or desired coordinate position values are sent from the computer system 14 via buffer memory 86 as well. The commanded/desired position values are converted from digital values to analog values via digital to analog ("D/A") converters 104 and 106, and these analog values are sent to the pan and tilt drivers 92 and 96 to control the corresponding desired angles β 177 and α 175 to position the gimbaled sensor system 16.

Furthermore, a low power infrared laser or LED 77 is coupled to the optics 76 and also coupled to the light source driver 79. The light source driver 79 provides enough power to drive the laser or LED 77. The low power infrared laser or LED 77 is used to provide and place a glint on the user's eye 20 to enhance finding the center of the user's eye 20.

The gimbaled sensor system also includes a directional microphone 108 that can provide voice or speech recognition between the user 22 and the computer system 18. The microphone 108 is coupled to the computer interface card 64 via an audio amplifier 110. The audio amplifier 110, in turn, is attached to an audio filter 112 which is coupled to an analog to digital ("A/D") converter 114. The audio amplifier 110 amplifies the signals received from the microphone 108, and these amplified signals are filtered by the audio filter 112. The filtered signals are then converted from analog to digital signals, and the digital signals are sent to the buffer memory 86.

Therefore, the computer interface card 64 functions to receive the relevant information or data relating to the position of the user's head 18 and eye 20 from the gimbaled sensor system 16 and sends this information and data to the memory buffer 86. The memory buffer 86 interfaces with the computer system 14 via a computer interface bus 66, and the computer interface bus 66 is coupled to a display driver 68 (i.e. VGA card). The display driver 68 drives the display system 12. The computer system 14 runs the algorithm to control the gimbaled sensor system 16 and directs the corresponding hardware to perform desired or commanded functions via the movement of the user's eye 20 or via the user's voice or speech commands. For example, a facial recognition program can be executed by the computer system 14 to track the movement of the head 18 of a specific user 22. The program is executed, and if the user 22 moves his head 18 to a different position, then the camera 26 or photo-sensor 74 picks the images up through the optics 76 and compares it with the previous position of the user's head 18. The zoom control line 78 is connected via a digital to analog ("D/A") converter 81 to buffer memory 86. The gimbaled sensor system 16 is directed to correspondingly follow the movement of the head 18 by sending commands to the pan and tilt drivers 92 and 96 to control the angles of the pan and tilt servos 94 and 98 to move the gimbaled sensor system 16 to a position in which the gimbaled sensor system 16 is locked onto the user's eye 20 by following the 3-D head movement.

However, any suitable hardware or components may be utilized for carrying out the purposes of the present invention which is not limited to the above described gimbaled sensor system in FIG. 3C.

B. Vectors and 3-D Geometry Associated With Eye/Head Tracking System

Figure 4A:
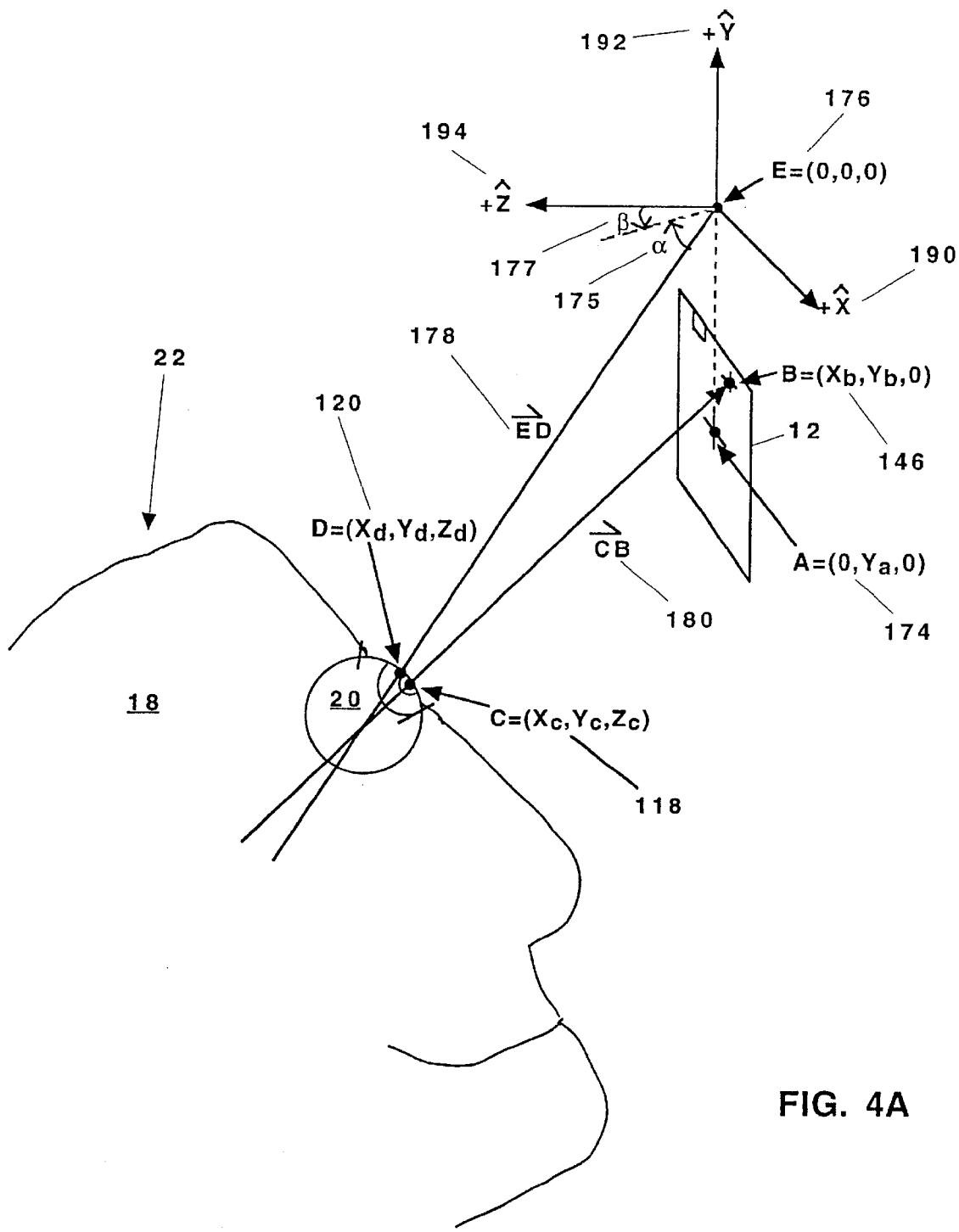
FIG. 4A depicts a perspective view of the vectors and 3-D geometry in Euclidean coordinates that are associated with head/eye tracking.

FIG. 4A shows a perspective view of the vectors and 3-D geometry in Euclidean coordinates that are associated with eye/head tracking. Point A 174 is at the center of the display screen 12 as shown in FIG. 4A. Screen gaze point B 146 in 3-D coordinates on the display screen 12 is the point at which the user 22 is focused on the display screen 12. Point C 118 in FIG. 4A represents the center of the cornea of the user's eye 20 in 3-D coordinates while point D 120 represents the center of the glint on the user's eye 20 provided by the infrared laser or LED 77 (i.e. see FIG. 3C) in 3-D coordinates with point E 176 at origin of coordinate axis X 190, Y 192, and Z 194. The rotational axis which are set to be aligned with coordinate axis X 190 and Y 192 when β=0 of the gimbaled sensor system also intersect at point E 176. Point E 176 is aligned vertically and directly above point A 174 (i.e. the center of the display or screen 12). Vectors ED 178, CD 182 (not shown), and CB 180 show gimbaled sensor system 16 line of sight as vector ED of the user's eye 20 and screen gaze direction as vector CB 180, and the vector between glint 119 and cornea 117 centers (see FIG. 4C). Tilt and pan servo angles α 175 and β 177 of the gimbaled sensor system 16 (Shown in FIG. 1A) at point E 176 and range distance measurement(s) (by ultrasonic and/or laser range finding equipment) and/or by appropriate image/processing algorithm(s) along with R 206 and γ 121 are all used to calculate the screen gaze coordinates at point B 146 in FIG. 4A. The eye 20 may be illuminated by a low power infrared laser or LED 77 (i.e. see FIG. 3C) placed in the center of the camera field of view (i.e. Point E 176) to further enhance measurements of points C 118 and D 120 as is known in the prior art.

However, any suitable system or method associated with the performance of eye and head tracking may be utilized for carrying out the purposes of the present invention which is not limited to the ways and methods shown in FIG. 4.

C. Determining Closest User

Figure 4B:
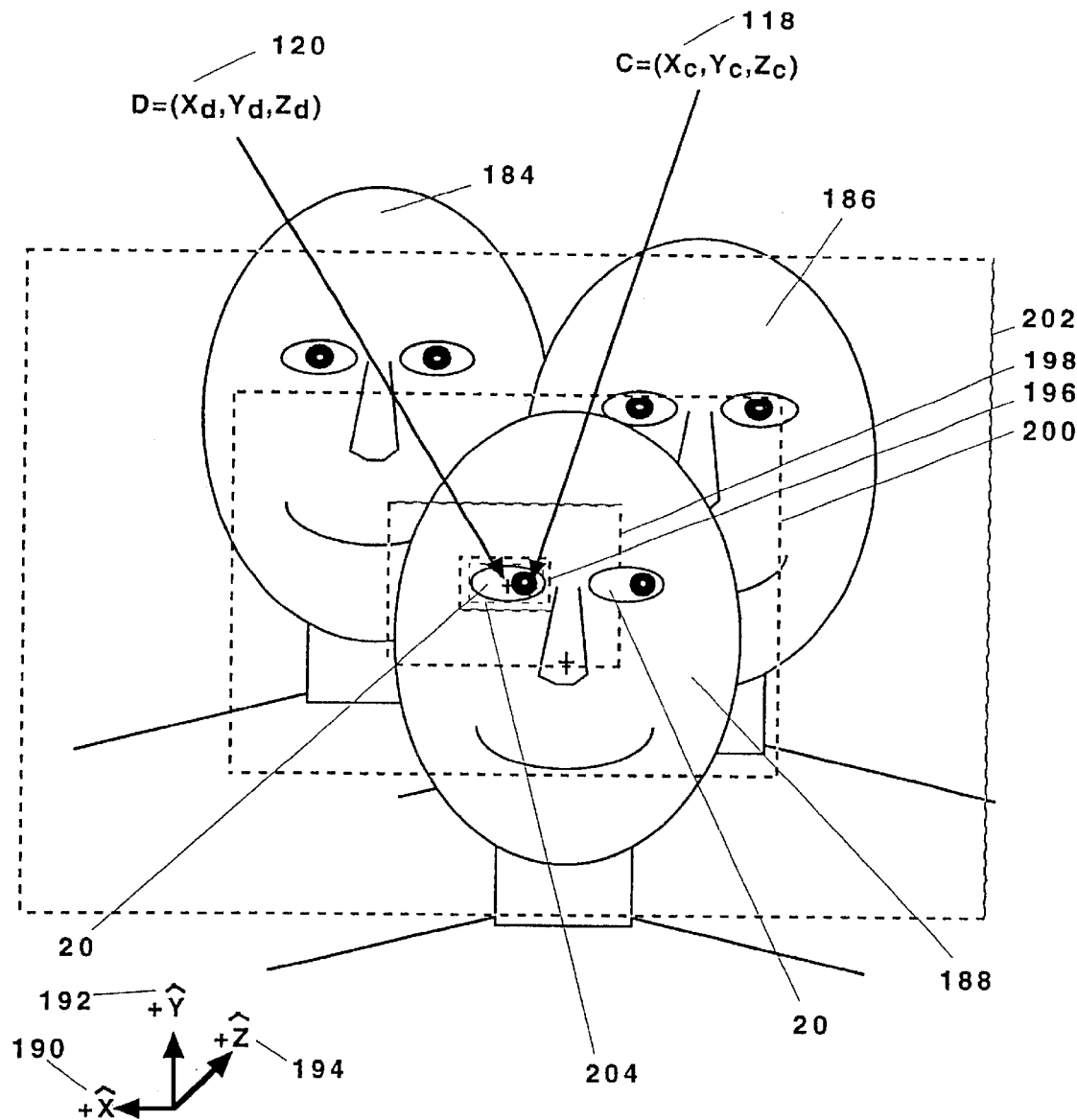
FIG. 4B depicts a front field of view from a camera or photo sensor used with the eye control system wherein images of three users are detected or sensed by the camera or photo sensor and the images are used to determine the closest user to the display or screen.

FIG. 4B shows a wide field of view from camera(s) 26 or image/photo sensor 74 (shown in FIG. 3C) with three users 184, 186, and 188 and Cartesian coordinate axes X 190, Y 192, and Z 194. The closest user 188 may be detected by first doing an ultrasonic scan of the field of view to find the closest object. A segmentation image processing algorithm may then be used to segment the profile of the closest user 188 from a wide camera field of view and segment the user's eyes 20 thereby identifying the user's eyes 20 by determining the relative size of the segmented region around each of the user's eyes 20. The gimbaled sensor system 16 is then adjusted to focus on the approximate center of one of the closest user's eyes 20. A magnification step is then applied in either large discrete steps 202, 200, 198, 196, and 204 or continuously until the eye 20 covers up the entire field of view 204 of the camera 26 or image/photo sensor 74 as shown in FIG. 4C.

However, any suitable system or method for determining the closest user may be utilized for carrying out the purposes of the present invention which is not limited to the ways shown in FIG. 4B.

D. Magnified Field of View of User's Eye

Figure 4C:
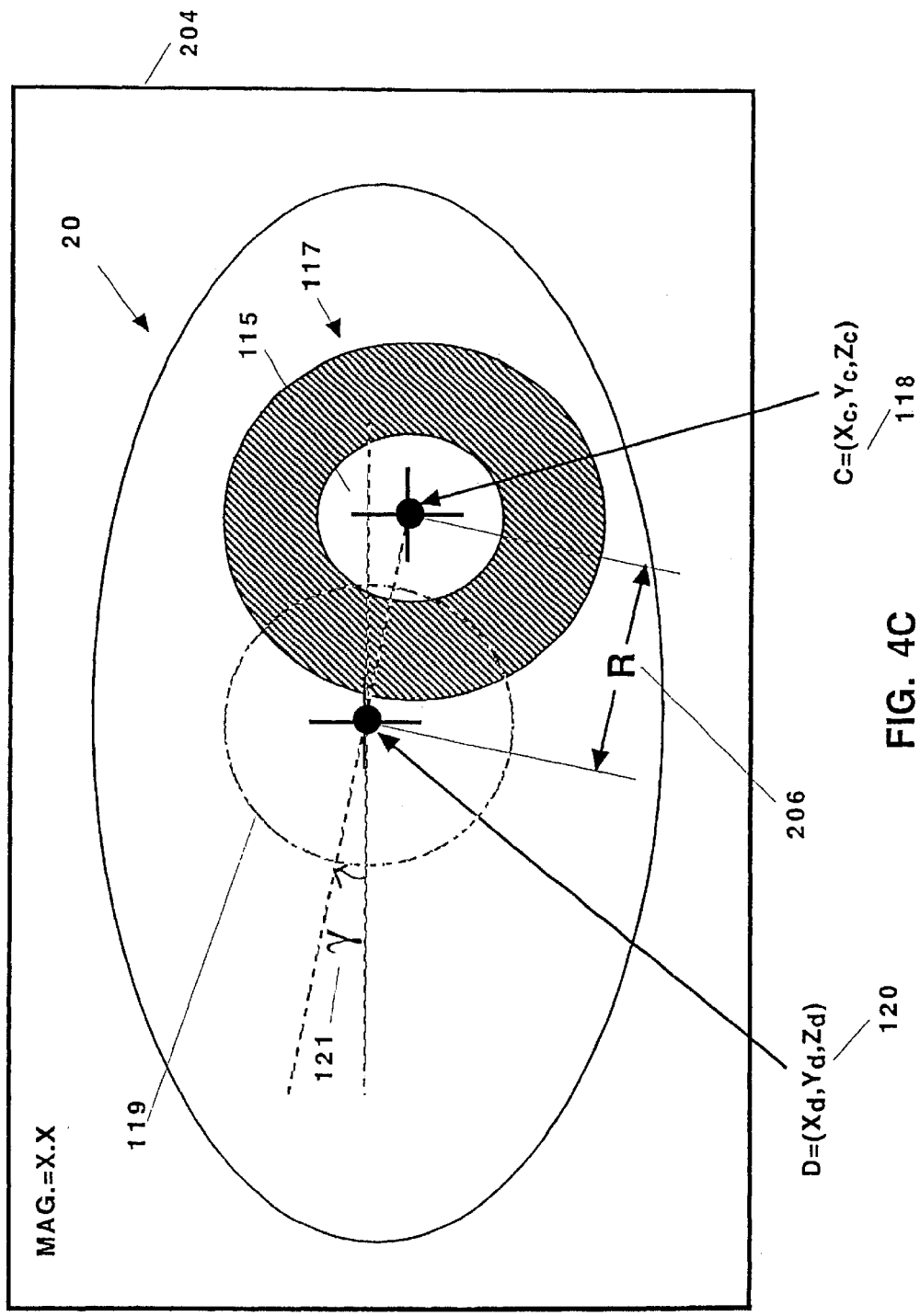
FIG. 4C depicts a front magnified field of view from a camera or image sensor used with the eye control system wherein images of the eye of the user is detected or sensed by the camera or image sensor and the images are used to determine the screen gaze coordinates of the user on the display.

FIG. 4C shows the magnified field of view 204 of the camera(s) 26 or image/photo sensor 74 that is part of the gimbaled sensor system 16. This magnified view 204 is focused on the center of glint, enhanced by infrared LED or laser 77 as seen in FIG. 3C, of the user's eye 20 at point D 120. The gaze-offset of the user's pupil to point C 118 with respect to point D 120 shown with angle γ (gamma) 121, and R 206 is determined by calculating the center of the glint as point D 120 and the center of the cornea as point C 118. The angles α 175 and β 177 of FIG. 4A, radial distance R 206 and angle γ of FIG. 4C, and the distance between point E 176 and point D 120 of FIG. 4A, are used as inputs to a neural network (that is trained by supervised learning) or other function approximator to calculate the screen 12 gaze coordinates at point B 146 shown in FIG. 4A.

However, any suitable system or method for magnifying the field of view of a camera or photo sensor may be utilized for carrying out the purposes of the present invention which is not limited to the ways shown in FIG. 4C.

B. The Software Algorithm for the Specific Automatic Scrolling System

1. The Overall Software Algorithm for the Specific Automatic Scrolling System

FIGS. 5 to 7 show the method and screen sensor coordinate measurement algorithm 116 of controlling automatic scrolling and/or control of information on a display or screen 12 by obtaining gaze measurements for providing the relative position of the user's head 18 and eye 20 to the display screen 12 and gimbaled sensor system 16.

Figure 5A:
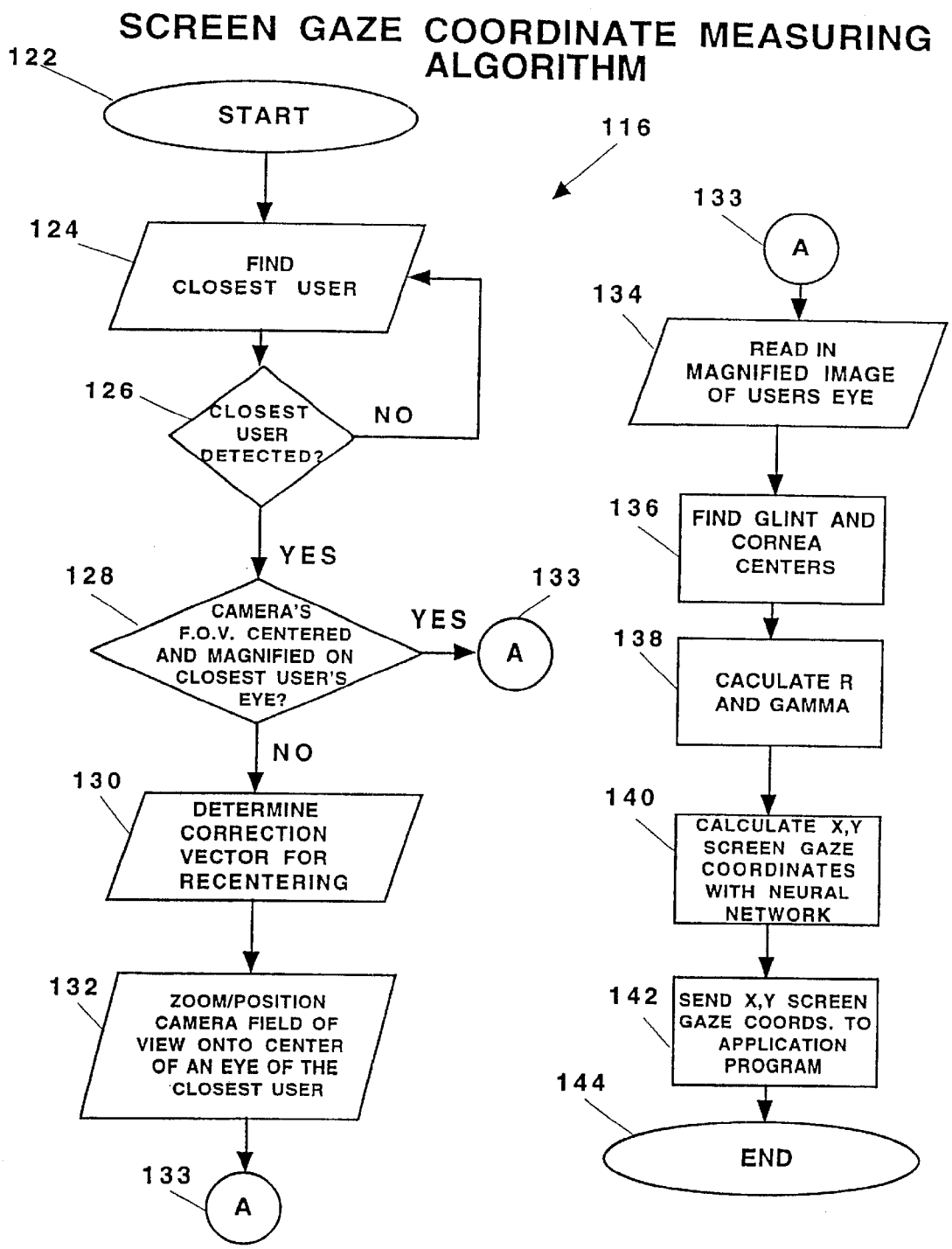
FIG. 5A is a flow chart of an image processing algorithm for tracking the user's head and eye.

FIG. 5A shows a specific screen gaze coordinate measurement algorithm 116 that drives the hardware system 10 shown in FIGS. 1A, 1B, 1C, 3A, 3B and 3C to control the scrolling and display of information on the display screen 12. This screen gaze measurement algorithm 116 is used for identifying the points C 118 (cornea 117 center) and D 120 (glint 119 center) within the user's eye 20 as shown in FIGS. 4A, 4B, and 4C. The screen gaze measurement algorithm 116 begins at start block 122, and the algorithm 116 first finds, at block 124, whether a user 22 is detected by using the camera(s) 26 or image/photo sensor 74, and range finder 88 of FIG. 3C, or directional microphone 108, and image processing (i.e. obtaining and comparing images) method or, alternatively, by an ultrasonic method finding minimum distant. The next step in algorithm 116 is to determine at decision block 126 whether the closest user has been detected. If the closest user 22 has not been detected, then the algorithm 116 loops back to block 124 to continue to search for the closest user and again checks at decision block 126 whether the closest user 22 has yet been detected. If a number of users 22 are detected by the camera 26 or photo sensor 74 and image processing method at block 124, then the closest user 22 is determined by a suitable way for determining the closer of several images (i.e. segmentation image processing and/or ultrasonic scanning) at block 126.

The next step of the screen gaze measurement algorithm 116 is at decision block 128 which is to determine whether the camera or photo sensor field of view is centered and magnified on the user's eye 20. If the field of view is not centered and magnified on the closest user's eye, then the next steps of the algorithm determine the correction vector for re-centering the field of view, as shown in block 130, and to zoom or position the camera(s) 26 or image/photo sensor 74 field of view onto the center of the closest user's eye 20, as shown in block 132 where the magnified image is then read in at block 134 where program control is passed via connector A 133. The re-positioning of the camera(s) 26 or image/photo sensor 74 at the center of the user's eye 20 is accomplished via pan and tilt servos 94 and 98 (See FIG. 3B and 3C), and the magnification of the image of the eye 20 is accomplished through zoom control line 78 via digital to analog converter 81 of FIG. 3C. The re-positioning and magnification results in the field of view of the camera(s) 26 or image/photo sensor 74 being covered by most of the user's 22 eye 20. If the field of view is centered and magnified on the closest user's eye 20, then the algorithm screen gaze coordinate measurement 116 moves directly to the next step to determine 2D coordinate of points C 118, and D 120 on user's eye 20 at block 136 after reading in the magnified image of the user's eye 20 which is analyzed by image processing.

The next task to be accomplished by the screen gaze coordinate measurement algorithm 116 is to determine the 2-D screen gaze coordinates $B(X_b,Y_b)$ 146 through a perspective mapping given $\alpha$ 175 and $\beta$ 177, distance between points E 176 and D 120, distance between points D 120 and C 118, and $\gamma$ 121, at block 140. To determine the screen gaze coordinates, the screen gaze coordinate algorithm 116 must first determine the 2-D coordinates of the points C 118 and D 120 on the user's eye 20. There are many methods of calculating the screen gaze coordinates, but because of the inherent non-linearities and uniqueness in the 3D structure of a user's eye 20, these calculations can be very complex. One method of calculating the screen gaze coordinates $B(X_b,Y_b)$ 146 from $\alpha$ 175, $\beta$ 177, distance ED 178 between points E 176 and D 120, distance R 206 between points D 120 and C 118, and angle $\gamma$ 121 is by using a neural network (see FIG. 5C) as a function approximator. Neural networks may be good function approximators if properly trained. An appropriate calibration procedure can be used for training each user in conjunction with an automatic user identification system that remembers the corresponding training weights for each user that has been identified. Thus, calibration may not be required frequently if each user is uniquely identified. The training of the neural network can be done through ordinary supervised learning. This is accomplished by having a calibration procedure where the user is asked to follow a cursor on the screen with their eyes where the error between the network output and the actual cursor position is used to adjust the weights of the neural network. The generalizing capability of the neural network may also be strong enough to cover all user's eyes 20 depending on the robustness of the algorithm used and thereby not requiring any calibration procedure.

At block 136, the glint 119 and cornea 117 perspective centers D 120 and C 118 respectively are obtained by segmenting and clustering the magnified eye image 204 and calculating the center of gravity of the two smaller clusters representing the glint 119 and cornea 117. After the perspective view of the centers D 120 and C 118 are found in the image plane, the angle $\gamma$ 121 and the distance R 206 can be calculated. After the inputs $\alpha$ 175, $\beta$ 177, distance ED 178 between points E 176 and D 120, R 206 between points D 120 and C 118, and angle $\gamma$ 121 are measured and calculated, the screen gaze coordinate measurement algorithm 116 goes on to block 140 to calculate the screen gaze coordinates $B(X_b,Y_b)$ 146. At block 140, the screen gaze coordinates $B(X_b,Y_b)$ 146 are determined through a neural network (see FIG. 5C), and these coordinates are sent to the software application program at block 142. The algorithm ends at block 144.

Any suitable algorithm, software program, sensing system, or other implementation for approximating the screen gaze coordinates $B(X_b,Y_b)$ 146 may be utilized for carrying out the purposes of the present invention which is not limited to the ways described above and shown in FIG. 5A.

2. The Image Processing Algorithm for Head Tracking

Figure 5B:
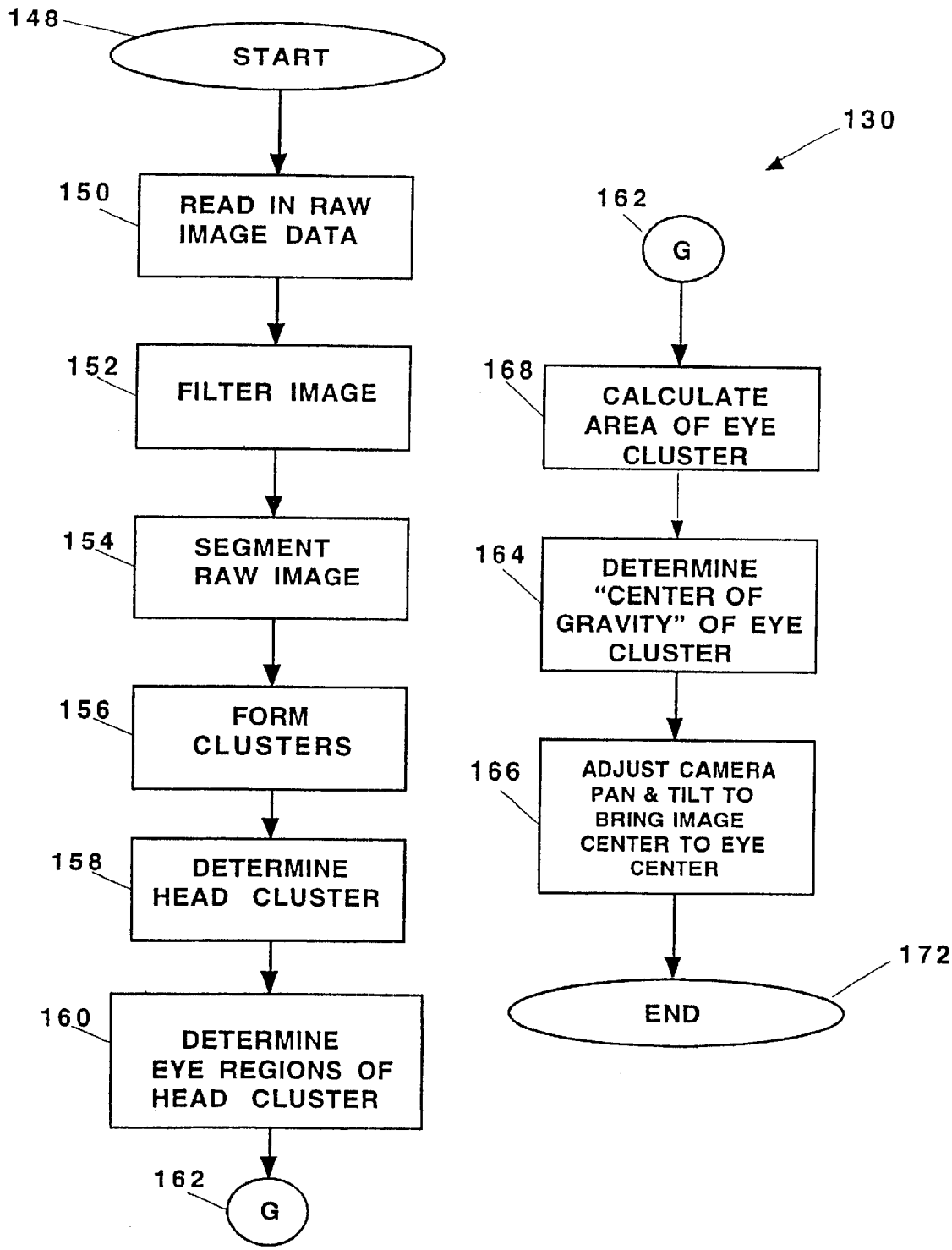
FIG. 5B is a flow chart of a specific algorithm for screen gaze control that is implemented by the hardware (see FIGS. 3A, 3B, 3C).

FIG. 5B shows an algorithm 130 for calculating correction vector (i.e. used to determine the closest user 22 and track the user's head 18 and eye 20) for recentering (see block 130 of FIG. 5A). The algorithm 130 starts at block 148. The first step at block 150 of the algorithm 130 is to read in raw image data. The next step at block 152 is to filter image (i.e. filter out high frequency spatial data such as image noise), and at block 154, images are segmented (i.e. edge detection). The algorithm 130 then moves to the next step at block 156 of forming clusters by finding regions that have edges and putting them into groups, and the following step at block 158 is to determine head clusters (i.e. find oval shaped cluster of medium size). The algorithm 130 then goes to the step at block 160 for determining eye regions of head cluster (i.e. find the small cluster at the top region of the head cluster and choose the cluster of medium size having the center closest to the image center) and goes on via connector G 162 to the step at block 168 for determining the area of a user's eye cluster. At block 164, the "center of gravity" of the calculated eye cluster is calculated. The algorithm step at block 166 is to adjust the pan and tilt angles $\alpha$ 175 and $\beta$ 177, respectively, of the gimbaled sensor system 16 to bring the image center to line up with glint 119 center at point D 120 of FIG. 4A, 4B, and 4C. The camera(s) 26 or image/photo sensor 74 view is then zoomed in so that a large portion of an eye cluster area is in the field of view of the camera(s) 26 or image/photo sensor 74 centered on point D 120. The image processing algorithm then ends at block 172.

However, any suitable algorithm, software program, or other implementation for image processing may be utilized for carrying out the purposes of the present invention which is not limited to the ways shown in FIG. 5B.

Figure 5C:
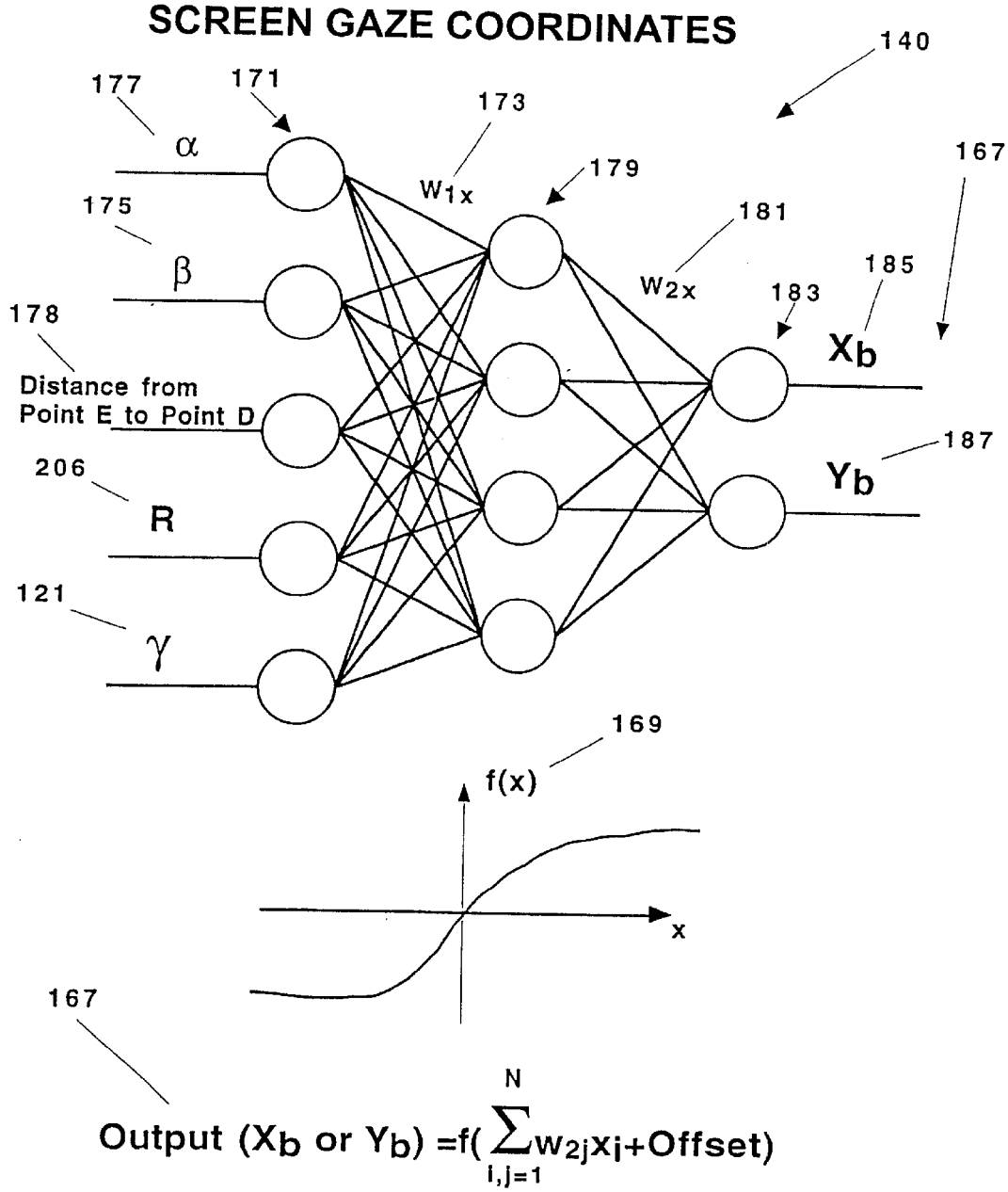
FIG. 5C is an example of a neural network used for calculating the screen gaze coordinates.

FIG. 5C shows an example of a neural network algorithm 140 used to approximate screen gaze coordinates $X_b$ 185 and $Y_b$ 187 of point B 146. Five inputs are shown as $\alpha$ 175, $\beta$ 177, distance ED 178 from point E 176 to point D 120, R 206, and $\gamma$ 121, all connected to input layer 171 with five nodes. A hidden layer 179 with four nodes is shown connected to the input layer 171 via connecting weights ($W_{1x}$) 173. Output layer 183, shown with two nodes and output screen gaze coordinates 167 of point B 146, is connected to the hidden layer 179 via connection weights ($W_{2x}$) 181. A sigmoidal output function f(x) 169 is shown with output equation 167 where the weighted connections from a previous layer are multiplied by the outputs of the previous layer and summed. That result is then added to a threshold offset value. The neural network can be trained using back propagation or any suitable training algorithm. The following references include more details of neural network design: Lippmann, "An Introduction to Computing with Neural Nets," *IEEE ASSP Magazine*, April 1987, at pp. 4–22; "Special Issue on Neural Networks II: Analysis, Techniques & Applications," *Proceedings of the IEEE*, Vol. 78, No. 10, October 1995; and Widrow, Lehr, "30 Years of Adaptive Neural Networks: Perceptron, Madaline and Back propagation," *Proceedings of the IEEE*, Vol. 78, No. 9, September 1990, at pp. 1415–1442.

Figure 6A:
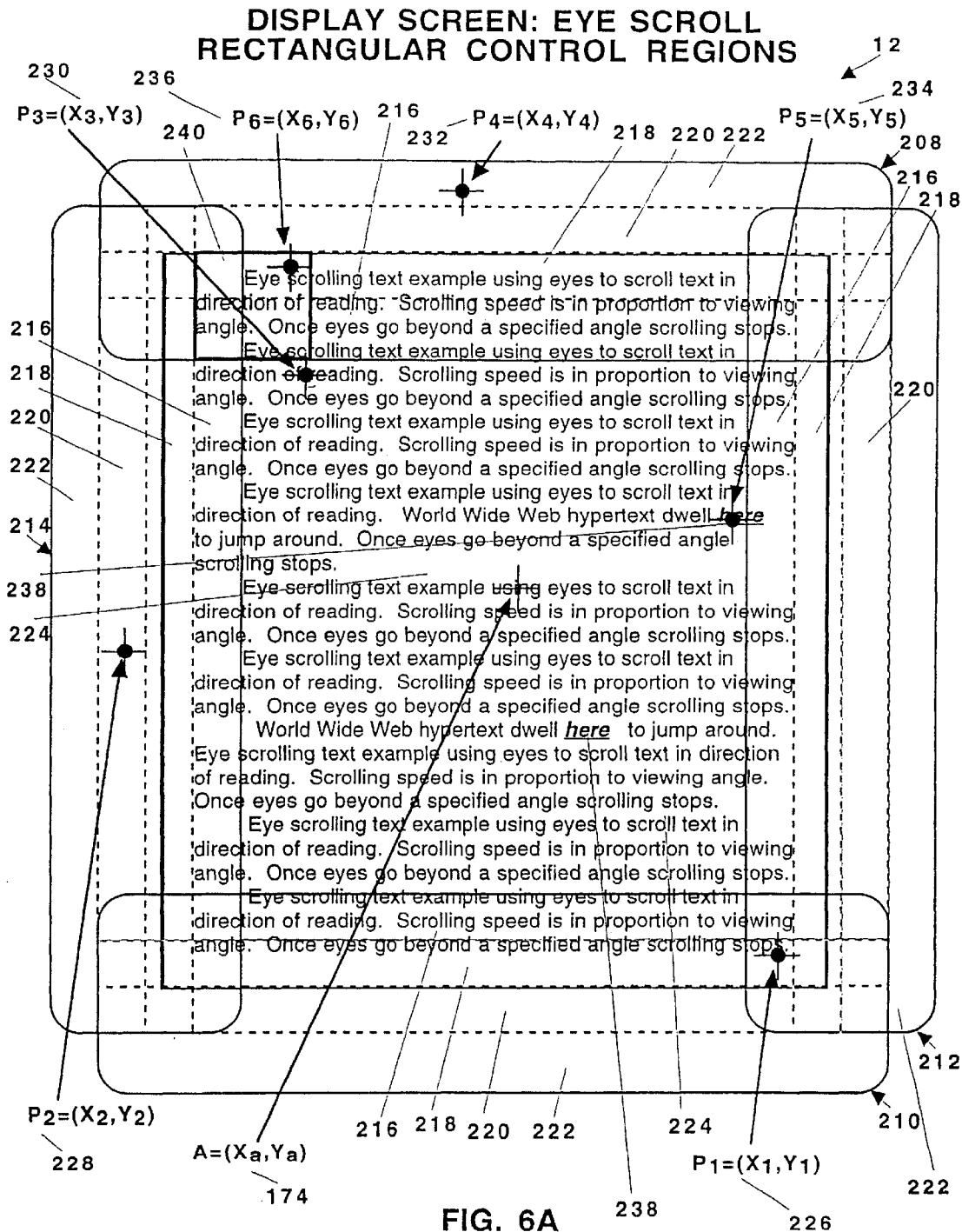
FIG. 6A depicts a front view of a display or screen showing a preferred embodiment for controlling automatic scrolling of information, images, or text wherein the preferred embodiment uses rectangular automatic scroll control regions and scroll rate control regions for automatically scrolling the display or screen.

V. Automatic Control of Scrolling Embodiment Using Peripheral Rectangular Activation Regions A. Operation of Peripheral Rectangular Activation Regions FIG. 6A shows an embodiment for controlling automatic scrolling of information on a display 12 (32, or 42) wherein the embodiment uses rectangular eye control regions 208, 210, 212, and 214 for scrolling the display or screen 12 (i.e. generally for scrolling text but not limited to text). Four rectangular scroll control regions are shown as follows: an upper region 208, a lower region 210, a right region 212, and a left region 214. Within each control region, four scroll rate regions are defined as follows: a low scroll rate region 216, a medium low scroll rate region 218, a medium high scroll rate region 220, and a high scroll rate region 222 are shown around the peripheral of the display or screen 12. The inner scroll regions 216 and 218 have a slower scroll rate than the outer scroll regions 220 and 222. The scroll rate can be either a quantized (i.e. discrete scroll rate for each region) or a continuous function (i.e. intermittent levels of scroll rate from low to high correlated respectively to a position from the inner to the outer part of the region). The scroll rate is determined by the screen gaze coordinate of the user 22 on the screen 12 (i.e. point B 146 as seen in FIG. 4A). The scroll rate is designed to adaptively adjust to the reading speed of the user 22. If a user 22 gazes in the static control area 224 of the display or screen 12, then the scroll rate is set to zero.

B. Examples of Gaze Points within the Screen or Display with Peripheral Activation Regions 1. Gaze Points Within The Activation and Static Regions Some example gaze points are shown at P1 226, P2 228, P3 230, and P4 232 of the display 12 as shown in FIG. 6A. As stated earlier, the center of the display or screen surface 12 is represented at point A 174. If a user 22 gazes at point P1 226 within the medium low scroll up region 218 and low scroll left region 216, then the text will scroll on the display or screen 12 to the upper left by scrolling up at a medium low rate and to the left at a low rate. If a user 22 gazes at point P2 228 at the left side region within the medium high scroll control region 220, then the text on the display or screen 12 is scrolled to the right at a medium high rate. At gaze point P3 230 inside the static control area 224, the scroll rate is set to zero and the text does not move. At gaze point P4 232 inside the high scroll down region 222, the text will scroll down at a high rate (i.e. similar to a "page up" function).

2. Gaze Points on Hypertext Link Regions, Pop-Up Menus, and Single Line Focused Reading Hypertext link regions 238 of FIG. 6A are shown in bold italics and are underlined. For example, if a user dwells on a hypertext region 238 at point P5 234, the hypertext region becomes highlighted and the user may select the hypertext link by a specified selecting protocol, by means of a switch, speech commands, or some other type of input device 53 (see FIG. 3A,3B or 3C). The new information is then displayed from the location specified by the hypertext link that was selected. If the hypertext link region 238 is in a non-static scroll control region, for example, scroll left region 216, and the user stays focused on the hypertext region 238 for a specified dwell time, as it scrolls to the left, then the hyper text link may still be selected.

FIGS. 6A, 6B, 6C, 7A, 7B, and 7C show that a pop-up menu selection region 240 can be used with the present scroll system 10 in the top left area of the display or screen 12. In FIG. 6A, if a user 22 gazes at point P6 236 on pop-up menu selection region 240, then the pop-up menu selection region 240 may become highlighted. The scroll regions 216, 218, 220, and 222 overlapping the pop-up menu region 240 may be disabled to prevent scrolling when the user is looking at the pop-up menu region 240. The pop-up menu is selected by the user either through dwell time or other selection protocol such as a speech command. A pop-up menu (not shown) may be displayed where a user can then select through eye control, speech commands, or by other means such as a hand controlled mouse or keyboard. A pop-up menu may be activated by other means without having a pop-up menu selection region 240. For example, any selection made by speech, keyboard, or mouse control.

Figures 6B, 6C:
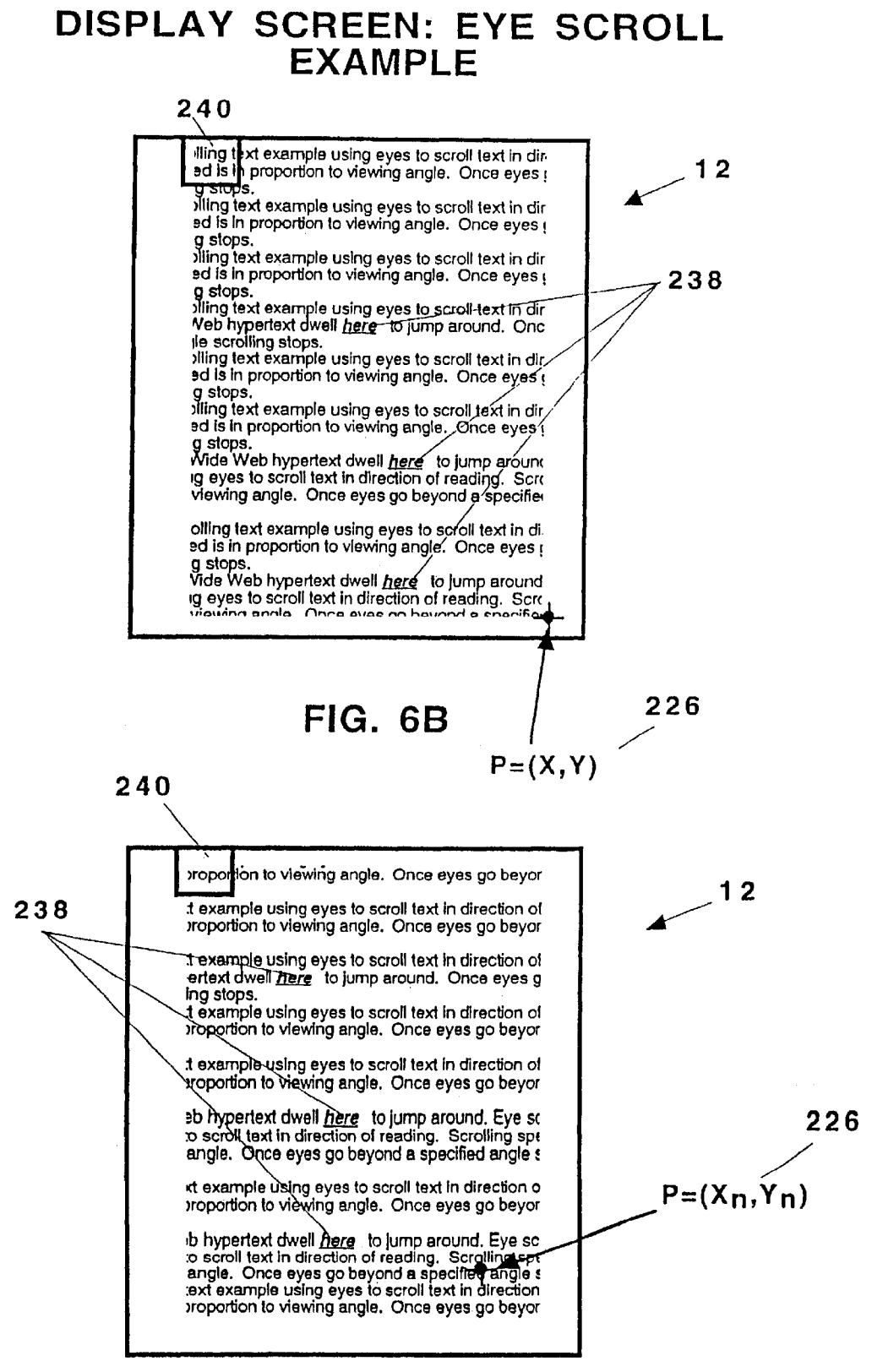

FIG. 6B and 6C show an example of text scrolling if the user were to gaze at point P 226 with old coordinates X, Y, in FIG. 6B and new coordinates Xn, Yn in FIG. 6C at the bottom right area of the display or screen 12. In these figures, the text scrolls upward at a medium low rate and to the left at a low rate. The pop-up menu selection region 240, which may be semi-transparent to underlying information, is shown in the top left area of the display or screen 12 in FIGS. 6A, 6B, and 6C. As a further option, the text may be adjusted so that a user 22 can focus on one line and read through the entire document (i.e. ticker tape style) without having to go back to start at the next line or the end of the previous line. This can be done by shifting the text up one line or down one line as a person respectively scrolls the text to the right or left (i.e. the next screen to the right would be identical to the present screen except shifted up one line while the previous screen to the left would be identical to the present screen except shifted down one line).

C. Scrolling Algorithm for Rectangular Peripheral Control Regions

Figure 6D:
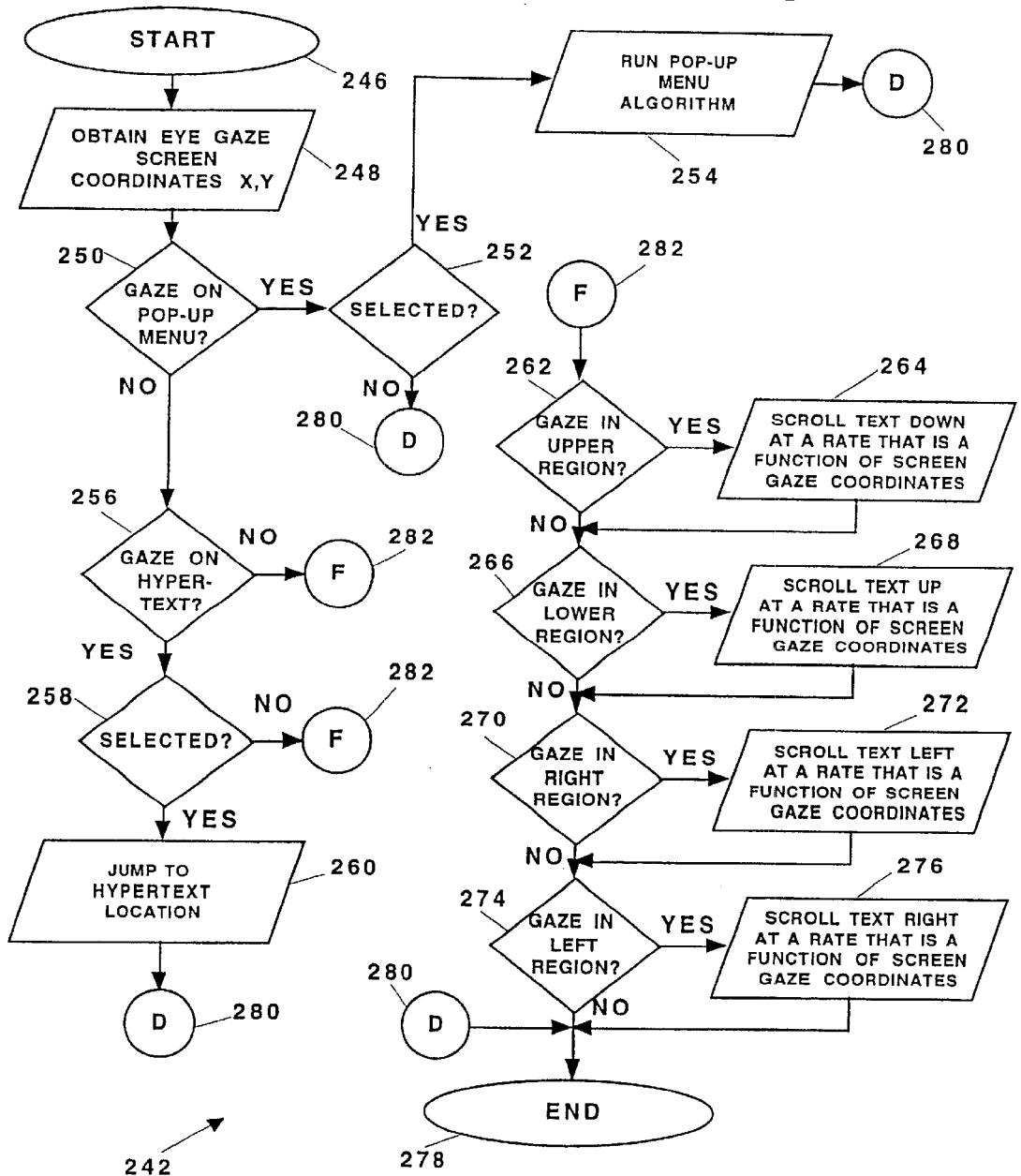
FIG. 6D is a block diagram of a specific algorithm for automatic scrolling of information, images, or text on a display or screen using the preferred embodiment of rectangular automatic scroll control regions.

FIG. 6D shows the gaze controlled scrolling algorithm 242 using rectangular peripheral control regions 208, 210, 212, and 214 outlined in flow chart form. The algorithm 242 starts at block 246. At block 248, the eye gaze screen coordinates (X, Y) are obtained as described in FIGS. 4A, 4B, 4C, 5A, 5B, and 5C. The algorithm 242 then moves to decision block 250 where the algorithm 242 checks to see whether the user 22 is gazing at the pop-up menu control region 240 (shown in FIGS. 6A, 6B, and 6C). If the gaze is in this menu region 240, then a decision at block 252 is made for selection. If the pop-up-menu is selected, then control is passed to the pop-up menu algorithm at block 254, and after the pop-up menu algorithm is run, the algorithm 242 passes control to the end at block 278 through connector D 280 and if pop-up menu region 240 is not selected, the pop-up menu routine is bypassed and control is passed onto the algorithm end 278 via connector D 280. If the eye gaze is not in the pop-up menu region 240, then control is passed to the next decision block 256 where hypertext gaze is determined. If the user 22 is not gazing at a hypertext region 238 (shown in FIGS. 6A, 6B, and 6C), then control of the algorithm 242 passes via connector F 282 to determine if a gaze is in a scroll region. If the user 22 is gazing at a hypertext region 238 (shown in FIGS. 6A, 6B, and 6C), then the region 238 may become highlighted and control is passed to decision block 258 where user selection is determined. User selection can be either dwell time, key on a keyboard, mouse button, speech recognition, or any other selection protocol. If no selection is made of the hypertext region 238, then control of the algorithm 242 passes to determine the gaze position and gaze region of the user 22 via connector F 282. If a hypertext region 238 selection, however, is made, then the algorithm 242 passes to block 260 where hypertext link is activated and new information is shown from the location specified by the hypertext link 238 that was selected (i.e. jump to hypertext location), and the algorithm 242 then passes control to the end at block 278 through connector D 280.

The algorithm 242 passes control to determine gaze position and gaze region of the user 22 via connector F 282. At decision block 262, the algorithm 242 determines whether the user's gaze is in upper control region 208 (see FIG. 6A). If the gaze is in this upper region 208, then, at block 264, the text is scrolled down at a rate dependent upon the gaze position within the control region 208 (i.e. inside a low 216, medium low 218, medium high 220, and high 222 region, within the upper region 208 as shown in the upper part of FIG. 6A). The algorithm 242 then passes control to decision block 266 to determine whether the gaze is in the lower control region 210 (i.e. FIG. 6A). If the gaze is in the lower control region 210, then, at block 268, the text is scrolled up at a rate dependent upon the screen gaze position within the control region 210 (i.e. inside a low 216, medium low 218, medium high 220, and high 220 region, within the lower region 210 as shown in the lower part of FIG. 6A). The algorithm 242 further passes control to decision block 270 where the algorithm 242 determines if the gaze is in the right control region 212 (see FIG. 6A). If the gaze is in the right control region 212, then, at block 272, the text is scrolled to the left at a rate dependent upon the gaze position within the control region 212 (i.e. inside a low 216, medium low 218, medium high 220, and high 222 region, within the right region 212 as shown in the right part of FIG. 6A). The algorithm 242 then passes control to decision block 274 where the algorithm 242 determines if the gaze is in the left control region 214 (see FIG. 6A). If the gaze is in the left control region 214, then the text is scrolled to the right at a rate dependent upon the gaze position within the control region 214 (i.e. inside a low 216, medium low 218, medium high 220, and high 222 region, within the left region 214 as shown in the left part of FIG. 6A).

However, any suitable algorithm or method for controlling the scrolling of information, data, text, images, etc. on a screen or display by using rectangular peripheral control regions may be utilized for carrying out the purposes of the present invention which is not limited to the ways shown in FIG. 6A, 6B, 6C, and 6D.

Figure 7A:
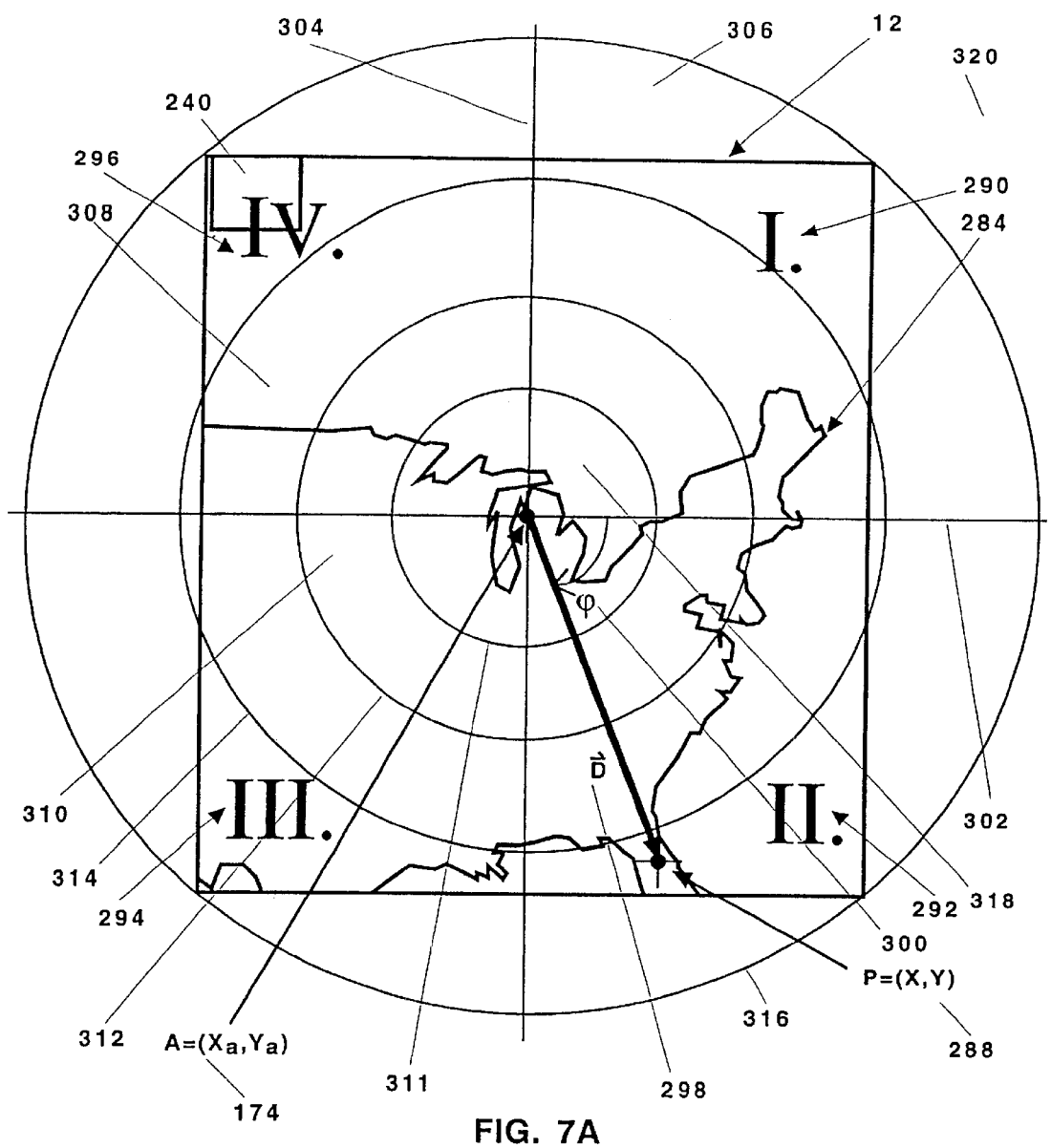
FIG. 7A depicts a front view of a display or screen showing another preferred embodiment for controlling automatic scrolling of information, images, or text wherein the preferred embodiment uses concentric rings regions or a screen gaze position vector with respect to screen center for scroll rate control regions to automatically scroll the display.

V. Automatic Control of Scrolling Embodiment Using Activation Regions Defined by Concentric Rings A. Operation of Quadrant Activation Regions Defined By Concentric Rings FIG. 7A shows circular eye control regions for scrolling the display or screen 12 (i.e. generally for scrolling images but not limited to images). Four regions separated by horizontal axis 302 and vertical axis 304 are shown as follows: an upper right quadrant region I 290, a lower right quadrant region II 292, a lower left quadrant region III 294, and an upper left quadrant region IV 296. The scroll control regions low 310, medium 308, and high 306 are respectively shown in concentric rings about the screen 12 and screen center point A 174. The rings 310, 308, and 306 are concentric about the screen 12 center point A 174. The scroll control regions 310, 308, and 306 can respectively be either quantized or discrete levels of low, medium, or high scroll rates as shown in FIG. 7A or the scroll rate and direction can be controlled as a function of the screen gaze angle φ (phi) 300 and distance D 298 (distance between A 174 and P 288) repeating as described later. Static zones or regions are defined as the inner most circle(s) 318, etc. and region(s) 320 beyond the outer most ring 316. The inner scroll regions 310 has a slower scroll rate than scroll region 308, and scroll region 308 has a slower scroll rate than scroll region 306. The scroll rate may be either a quantized (i.e. discrete scroll rate for each region) or a continuous function (i.e. intermediate levels of scroll rate from low to high correlated respectively to a position from the inner to the outer part of the region). The scroll rate is determined by the screen gaze position of the user 22 on the screen or display 12 within a quadrant and within a scroll rate concentric ring region.

B. Example of Activation Regions Defined By Concentric Rings

In FIG. 7A, a map of the United States 284 is displayed on the display or screen 12. The state of Michigan at point A 174 is centered on the display or screen 12. A gaze point P 288 of the user 22 is shown on the bottom right of the display or screen 12 in quadrant II 292 at the top of the state of Florida (partially occluded by screen edge). A vector D 298 is indicated on FIG. 7A, which represents the direction from point A 174 to point P 288 with a negative angle φ 300 from the horizontal axis 302 as shown in FIG. 7A. (A pop-up menu selection region 240, which may be semi-transparent to information displayed underneath, is also shown in quadrant IV 296, and the menu selection region 240 can be highlighted and/or selected when gazed upon by the user 22.

Figure 7B:
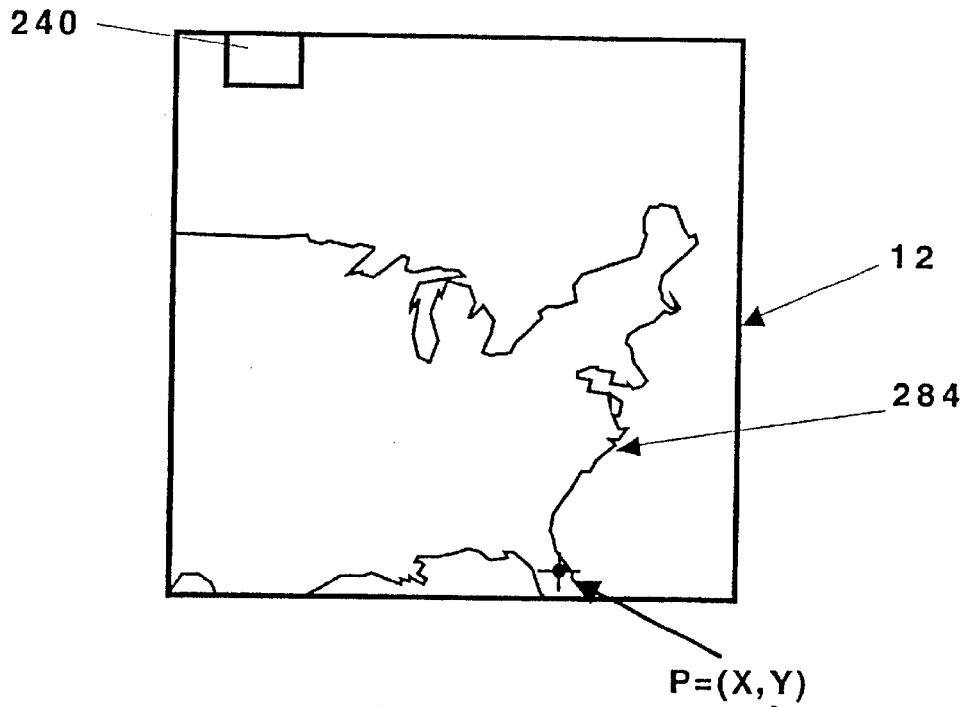
FIG. 7B depicts a front view of a display that is used for scrolling information, images, or text at which the user is gazing at the bottom right quadrant control region of the display (i.e. user gazing at Florida at the bottom right corner of the United States map).
Figure 7C:
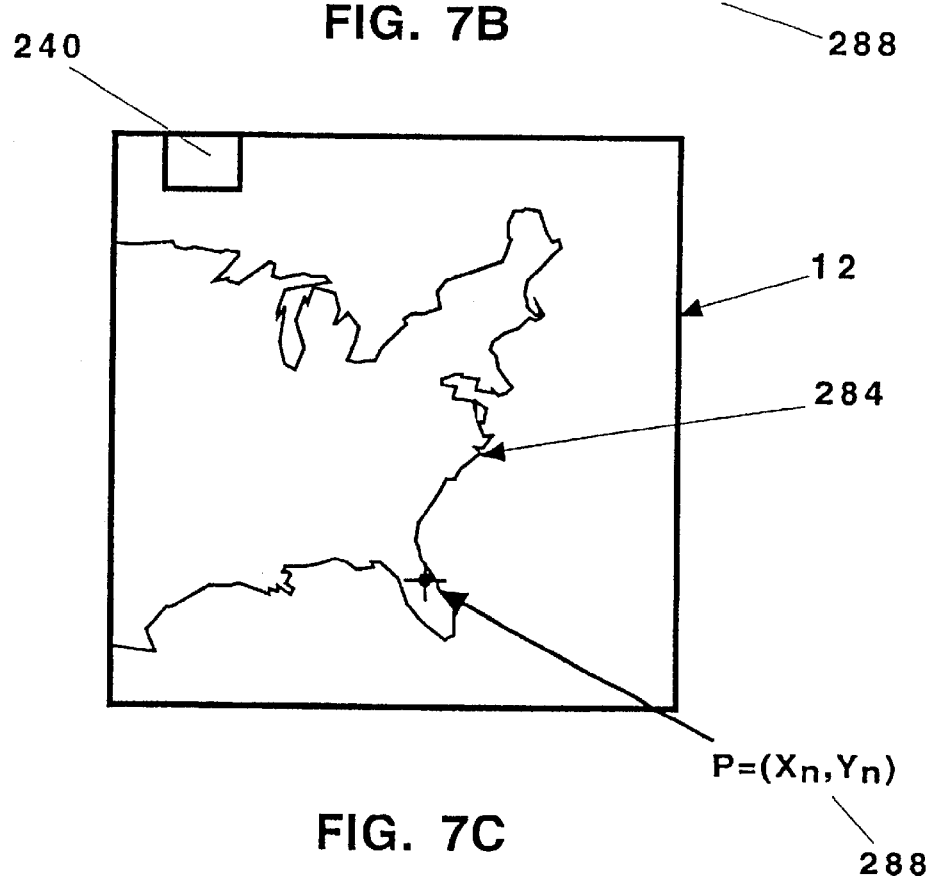
FIG. 7C depicts a front view of a display that has the information, images, or text in the display of FIG. 7B scrolling towards the center of the screen or display (i.e. image of Florida is moving to the center of the display).

FIGS. 7B and 7C show an example of image scrolling by concentric-ring scroll control regions 306, 308, or 310 of FIG. 7A. In FIG. 7B, if a user 22 gazes at the point P 288, which is inside the high scroll rate control region 306 of FIG. 7A at screen coordinates X and Y, the image scrolls up and to the left at a rate calculated from the vector R shown in FIG. 7A. The new position of point P 288 is shown in FIG. 7C with new screen coordinates Xn and Yn. The equations with proportionality constant $K_x$ and $K_y$ for adjusting scroll speeds are shown below:

$$D = \mathrm{SQRT}[((X_a-X)^2 + (Y_a-Y)^2)] \quad \text{Eq.(1)}$$

$$\phi = \mathrm{TAN}^{-1}[(Y-Y_a)/(X-X_a)] \quad \text{Eq.(2)}$$

$$X \text{ Scroll Rate} = K_x * D * \mathrm{COS}(\phi) \quad \text{Eq.(3)}$$

$$Y \text{ Scroll Rate} = K_y * D * \mathrm{SIN}(\phi) \quad \text{Eq.(4)}$$

The scroll rates may be quantized to the levels of low (i.e. region 310), medium (i.e. region 308), and high (i.e. region 306) by quantizing D 290 to those levels. A transparent pop-up menu selection region 240 is shown in the upper left corner of FIGS. 7A, 7B, and 7C.

C. Scrolling Algorithm for Concentric, Ring, Control Regions

Figure 7D:
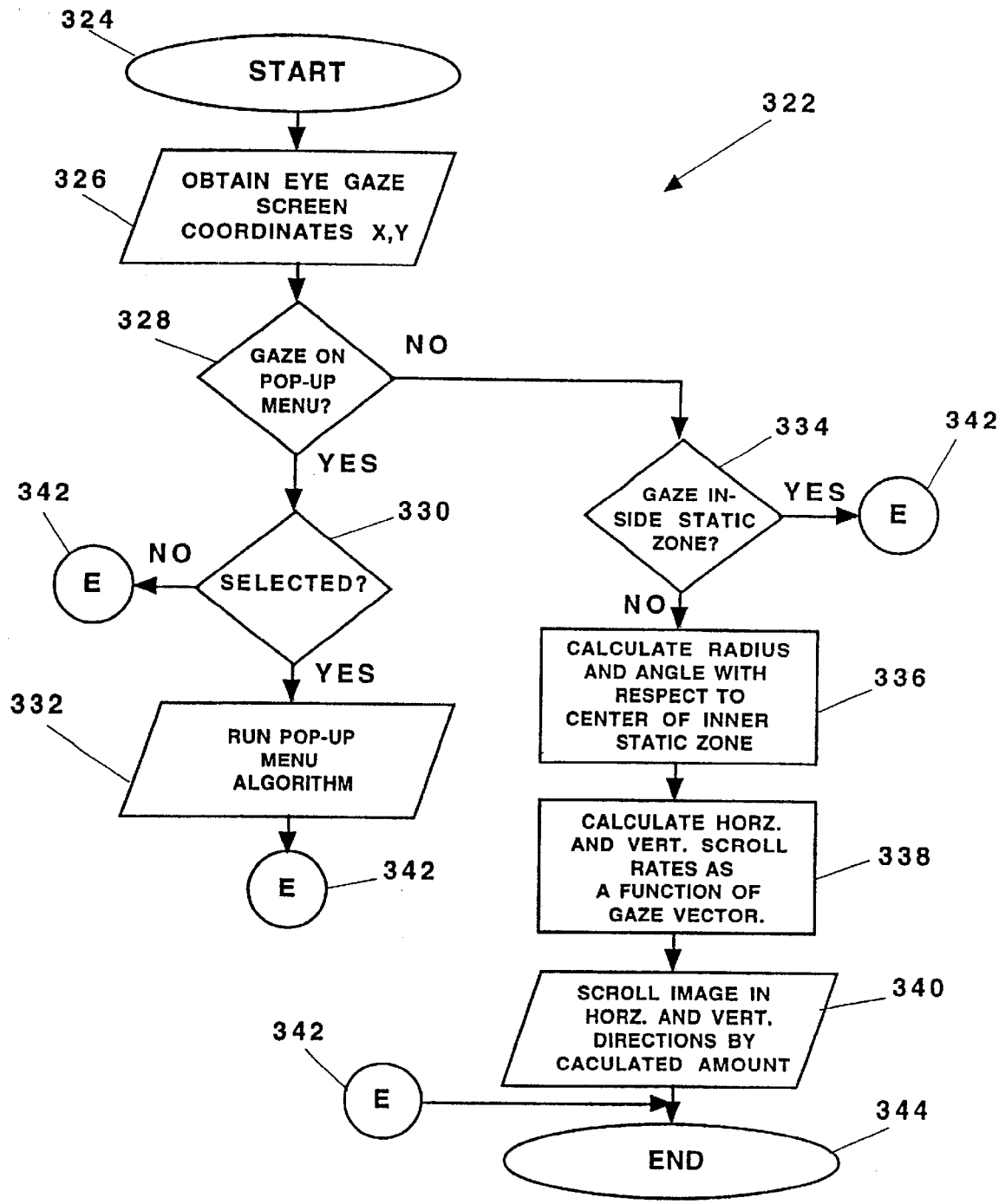
FIG. 7D is a block diagram of a specific algorithm for automatic scrolling or deleting of information, images, or text on a display or screen using the other preferred embodiment screen gaze position vector for automatic scroll control.

FIG. 7D shows a flow chart of the algorithm 322 for the circular scroll control regions 306, 308, and 310 shown in FIG. 7A. The algorithm 322 begins at block 324. At block 326, eye gaze screen coordinates X and Y are measured and calculated. The algorithm 322 passes control to decision block 328 to determine if the user 22 is gazing at the pop-up menu selection region 240. If the user 22 is gazing at this region 240, then it may be highlighted, and the algorithm 322 then passes control to decision block 330 to determine if the pop-up menu has been selected. If the pop-up menu 240 has been selected either by dwell time or some other selection protocol, then a pop-up menu algorithm is run at block 332 and then ends at block 344 via connector E 342. If the pop-up menu 240 is not selected, then the algorithm 322 ends at block 344 via connector E 342. If the user's gaze is outside of pop-up menu region 240, then algorithm control is passed onto decision block 334 to determine if the user's gaze is inside the inner static region 318 or the outer static region 320 of the display or screen 12 of FIG. 7A. If the user's gaze is in a static zone 318 or 320, then the algorithm 322 ends at block 344 via connector E 342. If the user's gaze is not inside a static region 318 or 320, then the radius and angle of the gaze point are calculated at block 336 as described by Eq.(1) and Eq.(2) respectively. At block 338, the horizontal (X) and vertical (Y) scroll rates are calculated by using Eq.(3) and Eq.(4) respectively. The image is scrolled in the calculated horizontal and vertical rates at block 340 where the algorithm 322 ends at block 344.

However, any suitable algorithm or method for controlling the scrolling of information, data, text, images, etc. on a screen or display 12 by using concentric, ring scroll control regions may be utilized for carrying out the purposes of the present invention which is not limited to the ways shown in FIGS. 7A, 7B, 7C, and 7D. Other shapes of control regions may be used for the purpose of scrolling.

VI. Scope of Disclosure

The preferred embodiment of this invention is described above in the Figures and Detailed Description. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application, and to enable others skilled in the art to best utilize the invention in various embodiments and with various modifications as are suited to the particular use contemplated.

Likewise, the use of the words "function" or "means" in the Detailed Description is not intended to indicate a desire to invoke the special provisions of 35 U.S.C. Sec. 112, Paragraph 6 to define this invention. To the contrary, if the provisions of 35 U.S.C. Sec. 112, Paragraph 6 are sought to be invoked to define the invention, the claims will specifically state the phrases "means for" or "step for" and a function, without reciting in such phrases any structure, material, or act in support of the function. Even when the claims recite a "means for" or "step for" performing a function, if they also recite any structure, material, or acts in support of that means or step, then the intention is not to invoke the provisions of 35 U.S.C. Sec. 112, Paragraph 6. Moreover, even if the inventors invoke the provisions of 35 U.S.C. Sec. 112, Paragraph 6 to define the invention, it is the intention that the invention not be limited only to the specific structure, material, or acts that are described in his preferred embodiment. Rather, if the claims specifically invoke the provisions of 35 U.S.C. Sec. 112, Paragraph 6, it is nonetheless the intention to cover and include any and all known or later developed structures, materials, or acts that perform the claimed function, along with any and all known or later developed equivalent structures, materials, or acts for performing the claimed function.

For example, the present invention specifically makes reference to hardware relating to the automatic scroll control system that includes a computer system, displays, screens, or monitors, other computer peripherals, a head tracking system, an eye tracking system, a head-mounted screen or display, and a transparent non-attached display or screen. However, numerous other types of computer systems, displays, screens, monitors, head tracking systems, eye tracking systems, head-mounted screens or displays, transparent non-attached displays or screens are well known to exist, and, most likely, numerous other computer and tracking related systems, devices, and components will be developed in the future. The inventions described herein are not to be limited in use with the specifically referenced types of computer and tracking related systems, devices, components, and peripherals, but rather, are intended to be used with any and all types of computer and tracking related systems, devices, components, and peripherals.

As another example, the present invention specifically makes reference to other hardware relating to filters, amplifiers, converters, distance range finder, camera, photo sensor, tilt drivers, servos, microphone, that are used to make up the automatic scroll control system. The disclosure specifically references several examples of such components, including laser or ultrasonic range finders, pan and tilt drivers, and pan and tilt servos, etc. However, numerous other hardware components for an automatic scroll control system are well known to exist, and, most likely, numerous hardware components for such a system will be developed in the future. The inventions described herein are not to be limited to the specific components or sub-systems disclosed in the preferred embodiment, but rather, are intended to be used with any and all applicable automatic scroll control systems. Likewise, the preferred embodiment depicted in the drawings show an automatic scroll control system with various components. Numerous other configurations, and multiple automatic scroll control systems, can be substituted for the single device.

Furthermore, the present invention specifically makes reference to a display or screen. However, any other equivalently defined displays or screens such as a windows, menus, etc. or information defined by boundaries are well known to exist, and, most likely, numerous other such displays or screens will be developed in the future. The inventions described herein are not to be limited in use with the specifically referenced types of displays or screens, but rather, are intended to be used with any and all types of displays, screens, windows, menus, or any other structures, methods, or boundaries that provide a display, screen, window, menu, sub-display, sub-screen environment, etc.

Further, the present invention specifically makes reference to an algorithm for obtaining head and eye gaze measurements for providing the relative position of the user's head and eye to the display or screen. However, numerous other algorithms or steps for such a method are well known to exist, and, most likely, numerous algorithms or steps for such a method will be developed in the future. Additionally, the present invention specifically makes reference to image processing methods or other methods for tracking the user's head and eye or for determining the closest user. However, numerous other algorithms or steps for such methods are well known to exist, and, most likely, numerous methods for such purposes will be developed in the future. The inventions described herein are not to be limited to the specific algorithms, methods, or steps disclosed in the preferred embodiment, but rather, are intended to be used with any and all such methods, algorithms, or steps. In its preferred form, applicant divides the method for obtaining head and eye gaze measurements for providing the relative position of the user's head and eye to the display or screen into several steps. However, with appropriate knowledge and application of that knowledge to those of ordinary skill in the art, some of the steps can be implemented into a single step. Likewise, applicant divides the method of image processing or other methods for tracking the user's head and eye for determining the closest user into several steps . However, with appropriate knowledge and application of that knowledge to those of ordinary skill in the art, some of the steps can be implemented into a single step. Thus, it is not the intention to limit the invention to any particular form or any number of method steps or to any specific procedural arrangement.

Also, the present invention specifically makes reference to an embodiment of a rectangular peripheral control regions and another embodiment of a quadrant concentric ring peripheral control regions for controlling the automatic scrolling of information on a display or screen. The present invention further discloses various scroll rate control regions such as quantized scroll rate regions (i.e. discrete scroll rates) or a continuous scroll rate function to allow the user to control the rate of scrolling. However, numerous other scroll control ways or scroll rate control methods either exist or are well known to exist. The inventions described herein are not to be limited to the specific scroll control or scroll rate control methods disclosed in the preferred embodiment, but rather, are intended to be used with and all such scroll control or scroll rate control methods.

Furthermore, the present invention specifically makes reference to a number of applications for the system for controlling automatic scrolling of information on a display or screen such as scroll control for a computer system, head-mounted display or pair of display glasses such as those used by technicians or assembly line workers, a transparent non-attached screen or display such as heads-up display of medical information for medical personnel and doctors. However, numerous other applications for the automatic scroll control system are well known to exist, and, most likely, other applications will be developed in the future. The inventions described herein are not to be limited to the applications for the automatic scroll control system disclosed in the preferred embodiment, but rather, are intended to be used with and all such scroll control or scroll rate control methods.

What is claimed is:

1. A method of controlling automatic scrolling of information on a display or a screen by a user comprising:

(a) finding a screen gaze position on the display or the screen of the user;

(b) determining whether the gaze position is within at least one activated control region comprising:

(i) determining whether the gaze position is within a static region defined by at least one of a number of concentric circles, (ii) determining whether the gaze position is within an activated control region defined by another of the number of concentric circles, and (iii) activating scrolling according to the gaze position within the activated control region to provide a desired display of information by scrolling the region at which the gaze of the user is positioned to the center of the display or the screen at a rate that is defined for the concentric circle at which the gaze of the user is positioned.

2. The method of controlling automatic scrolling of information on a display or a screen according to claim 1 wherein determining whether the gaze position is within an activated control region defined by another of the number of concentric circles further comprises:

determining whether the gaze position is within an activated quadrant wherein the information on the display or the screen is moved downward and leftward.

3. The method of controlling automatic scrolling of information on a display or a screen according to claim 1 wherein determining whether the gaze position is within an activated control region defined by another of the number of concentric circles further comprises:

determining whether the gaze position is within an activated quadrant wherein the information on the display or the screen is moved upward and leftward.

4. The method of controlling automatic scrolling of information on a display or a screen according to claim 1 wherein determining whether the gaze position is within an activated control region defined by another of the number of concentric circles further comprises:

determining whether the gaze position is within an activated quadrant wherein the information on the display or the screen is moved upward and rightward.

5. The method of controlling automatic scrolling of information on a display or a screen according to claim 1 wherein determining whether the gaze position is within an activated control region defined by another of the number of concentric circles further comprises:

determining whether the gaze position is within an activated quadrant wherein the information on the display or the screen is moved downward and rightward.

6. The method of controlling automatic scrolling of information on a display or a screen according to claim 1 further comprising:

determining whether the gaze position is within a pop-up menu region, and activating a pop-up menu algorithm when the gaze position is within the pop-up menu region.

7. The method of controlling automatic scrolling of information on a display or a screen according to claim 1 further comprising:

determining whether the gaze position is within a hypertext location, and activating a hypertext switching algorithm for jumping to a selected hypertext location when the gaze position is within a desired hypertext area.

* * * * *